(12) United States Patent
Hsu et al.

(10) Patent No.: US 10,769,366 B2
(45) Date of Patent: *Sep. 8, 2020

(54) VARIABLE DIMENSION VERSION EDITING FOR GRAPHICAL DESIGNS

(71) Applicant: Axure Software Solutions, Inc., San Diego, CA (US)

(72) Inventors: Victor Hsu, San Diego, CA (US); Martin Smith, San Diego, CA (US); Ian Gardner, San Diego, CA (US); Ben Fraser, Encinitas, CA (US)

(73) Assignee: Axure Software Solutions, Inc., San Diego, CA (US)

(*) Notice: Subject to any disclaimer, the term of this patent is extended or adjusted under 35 U.S.C. 154(b) by 158 days.

This patent is subject to a terminal disclaimer.

(21) Appl. No.: 15/634,787

(22) Filed: Jun. 27, 2017

(65) Prior Publication Data

US 2017/0293596 A1 Oct. 12, 2017

Related U.S. Application Data

(63) Continuation of application No. 14/176,348, filed on Feb. 10, 2014, now Pat. No. 9,703,457, which is a (Continued)

(51) Int. Cl.
*G06F 17/21* (2006.01)
*G06F 15/00* (2006.01)
(Continued)

(52) U.S. Cl.
CPC .......... *G06F 40/197* (2020.01); *G06F 3/0484* (2013.01); *G06F 8/38* (2013.01);
(Continued)

(58) Field of Classification Search
CPC .. G06F 16/9577; G06F 16/958; G06F 3/0481; G06F 8/38
See application file for complete search history.

(56) References Cited

U.S. PATENT DOCUMENTS

| 5,485,569 A | 1/1996 | Goldman et al. |
| 5,513,342 A | 4/1996 | Leong et al. |

(Continued)

FOREIGN PATENT DOCUMENTS

| CN | 102221993 A | 10/2011 |
| CN | 102622215 A | 8/2012 |

(Continued)

OTHER PUBLICATIONS

Office Action dated Mar. 8, 2018 for Republic of China Patent Application No. 201480034063.7.

(Continued)

*Primary Examiner* — Jordany Nunez
(74) *Attorney, Agent, or Firm* — MLO, a professional corp.

(57) ABSTRACT

Computer-implemented methods for allowing users to specify interactive graphical designs are provided. The graphical designs can comprise multiple dimension versions—such as a tablet dimension version or a phone dimension version. Some of the methods involve an inheritance structure that defines a first dimension version of the design as a child of a second dimension version of the design. Specifications for properties of widgets in the graphical design are applied to the design in accordance with the inheritance specification. Some of the methods involve an inheritance characterization that determines how properties of a widget are affected by the inheritance structure across different dimension versions. Some of the methods involve an existence property for the widgets.

10 Claims, 20 Drawing Sheets

Related U.S. Application Data continuation of application No. 14/025,745, filed on Sep. 12, 2013, now Pat. No. 8,671,352, which is a continuation-in-part of application No. 13/889,329, filed on May 7, 2013, now Pat. No. 9,389,759, and a continuation-in-part of application No. 13/889,331, filed on May 7, 2013, now Pat. No. 9,946,806.

(51) Int. Cl.

| | | |
|---|---|---|
| *G06F 3/048* | (2013.01) | |
| *G06F 40/197* | (2020.01) | |
| *G06F 16/958* | (2019.01) | |
| *G06F 8/38* | (2018.01) | |
| *G06F 3/0484* | (2013.01) | |
| *G06T 11/60* | (2006.01) | |
| *G06F 16/957* | (2019.01) | |

(52) U.S. Cl.
CPC ............ *G06F 16/958* (2019.01); *G06T 11/60* (2013.01); *G06F 16/9577* (2019.01)

(56) References Cited

U.S. PATENT DOCUMENTS

| | | | |
|---|---|---|---|
| 5,564,002 A | 10/1996 | Brown | |
| 5,649,216 A | 7/1997 | Sieber | |
| 5,708,764 A | 1/1998 | Borrel et al. | |
| 5,900,870 A | 5/1999 | Malone et al. | |
| 6,025,836 A | 2/2000 | McBride | |
| 6,038,567 A | 3/2000 | Young | |
| 6,300,947 B1 | 10/2001 | Kanevsky | |
| 6,829,646 B1 | 12/2004 | Philyaw et al. | |
| 6,832,353 B2 | 12/2004 | Itavaara et al. | |
| 7,174,286 B2 | 2/2007 | Martin et al. | |
| 7,219,309 B2 | 5/2007 | Kaasila et al. | |
| 7,222,306 B2 | 5/2007 | Kaasila et al. | |
| 7,290,006 B2 | 10/2007 | Xie et al. | |
| 7,345,688 B2 | 3/2008 | Baudisch et al. | |
| 7,349,837 B2 | 3/2008 | Martin et al. | |
| 7,362,311 B2 | 4/2008 | Filner et al. | |
| 7,398,473 B2 | 7/2008 | Stoner et al. | |
| 7,441,207 B2 | 10/2008 | Filner et al. | |
| 7,495,796 B2 | 2/2009 | Keane et al. | |
| 7,502,867 B2 | 3/2009 | Mitchell et al. | |
| 7,590,947 B1 | 9/2009 | Gay et al. | |
| 7,716,634 B2 | 5/2010 | Ross et al. | |
| 7,721,197 B2 | 5/2010 | Baudisch et al. | |
| 7,788,647 B2 | 8/2010 | Martin et al. | |
| 7,814,436 B2 | 10/2010 | Schrag et al. | |
| 7,861,158 B2 | 12/2010 | Martin et al. | |
| 7,895,522 B2 | 2/2011 | Wong et al. | |
| 7,900,137 B2 | 3/2011 | Ivarsoey et al. | |
| 7,916,157 B1 | 3/2011 | Kelley et al. | |
| 7,966,560 B2 | 6/2011 | Kanzaki | |
| 8,037,406 B1 | 10/2011 | Barnes et al. | |
| 8,132,123 B2 | 3/2012 | Schrag et al. | |
| 8,160,398 B1 | 4/2012 | Avidan et al. | |
| 8,201,101 B2 | 6/2012 | Wiley | |
| 8,266,521 B2 | 9/2012 | Sung et al. | |
| 8,356,247 B2 | 1/2013 | Krassner et al. | |
| 8,416,206 B2 | 4/2013 | Carpendale et al. | |
| 8,533,613 B2 | 9/2013 | Yu | |
| 8,621,422 B1 | 12/2013 | Hsu et al. | |
| 8,751,945 B1 | 6/2014 | Hsu et al. | |
| 8,843,585 B1 | 9/2014 | Normann et al. | |
| 9,182,252 B2 | 11/2015 | Dubin et al. | |
| 9,389,759 B2 | 7/2016 | Hsu et al. | |
| 9,811,186 B2 | 11/2017 | Zotov et al. | |
| 2003/0016246 A1 | 1/2003 | Singh | |
| 2003/0042190 A1 | 3/2003 | Robertson et al. | |
| 2003/0067489 A1 | 4/2003 | Candy Wong et al. | |
| 2003/0101203 A1* | 5/2003 | Chen ................... | G06F 16/958 715/234 |
| 2004/0012627 A1 | 1/2004 | Zakharia et al. | |
| 2004/0183817 A1 | 9/2004 | Kaasila | |
| 2005/0041859 A1 | 2/2005 | Nguyen et al. | |
| 2005/0071758 A1 | 3/2005 | Ehrich et al. | |
| 2005/0091608 A1 | 4/2005 | Gusmorino et al. | |
| 2005/0097444 A1 | 5/2005 | Ivarsey et al. | |
| 2005/0102360 A1* | 5/2005 | Chavis ................... | G06F 9/451 709/205 |
| 2005/0246627 A1 | 11/2005 | Sayed | |
| 2006/0005207 A1 | 1/2006 | Louch et al. | |
| 2006/0036955 A1 | 2/2006 | Baudisch et al. | |
| 2006/0218489 A1 | 9/2006 | Ovetchkine et al. | |
| 2006/0224978 A1 | 10/2006 | Albrecht et al. | |
| 2006/0242121 A1* | 10/2006 | DeVorchik ............ | G06F 16/168 |
| 2006/0277231 A1 | 12/2006 | Kral et al. | |
| 2006/0284878 A1 | 12/2006 | Zimmer | |
| 2007/0130525 A1 | 6/2007 | Murphy et al. | |
| 2007/0168931 A1 | 7/2007 | Martin et al. | |
| 2007/0171233 A1 | 7/2007 | Zimmer | |
| 2007/0192682 A1* | 8/2007 | Neil ........................ | G06F 9/451 715/234 |
| 2007/0220419 A1 | 9/2007 | Stibel et al. | |
| 2008/0052637 A1 | 2/2008 | Ben-Yoseph et al. | |
| 2008/0120538 A1 | 5/2008 | Kurz et al. | |
| 2008/0178117 A1 | 7/2008 | Gelman et al. | |
| 2008/0215998 A1 | 9/2008 | Moore et al. | |
| 2009/0089668 A1 | 4/2009 | Magnani et al. | |
| 2009/0109337 A1 | 4/2009 | Imai et al. | |
| 2009/0158180 A1 | 6/2009 | Magnani et al. | |
| 2009/0195652 A1 | 8/2009 | Gal | |
| 2009/0265644 A1 | 10/2009 | Tweed et al. | |
| 2009/0271742 A1 | 10/2009 | Zhang et al. | |
| 2010/0153544 A1 | 6/2010 | Krassner et al. | |
| 2010/0153836 A1 | 6/2010 | Krassner et al. | |
| 2010/0223593 A1 | 9/2010 | Eldridge et al. | |
| 2011/0107227 A1 | 5/2011 | Rempell et al. | |
| 2011/0179377 A1 | 7/2011 | Fleming | |
| 2011/0252302 A1 | 10/2011 | Yalovsky | |
| 2012/0072847 A1 | 3/2012 | Lee et al. | |
| 2012/0110480 A1 | 5/2012 | Kravets | |
| 2012/0131441 A1 | 5/2012 | Jitkoff et al. | |
| 2012/0174002 A1 | 7/2012 | Martin et al. | |
| 2012/0324428 A1 | 12/2012 | Ryan et al. | |
| 2013/0111327 A1 | 5/2013 | Tsutsui et al. | |
| 2013/0167080 A1 | 6/2013 | Ari et al. | |
| 2013/0198608 A1 | 8/2013 | Krassner et al. | |
| 2013/0205246 A1 | 8/2013 | Schmidt | |
| 2013/0219024 A1 | 8/2013 | Flack | |
| 2014/0258841 A1 | 9/2014 | Strong | |
| 2014/0297516 A1 | 10/2014 | Brown et al. | |
| 2014/0337706 A1 | 11/2014 | Hsu et al. | |
| 2017/0293596 A1 | 10/2017 | Hsu et al. | |

FOREIGN PATENT DOCUMENTS

| | | |
|---|---|---|
| CN | 102880664 A | 1/2013 |
| EP | 1221650 A2 | 7/2002 |
| EP | 1647906 B1 | 8/2010 |
| KR | 20080087570 A | 10/2008 |
| KR | 20130040057 A | 4/2013 |
| WO | 0146802 A2 | 6/2001 |
| WO | 03032151 A2 | 4/2003 |
| WO | 2003065191 A2 | 8/2003 |
| WO | 2009059062 A2 | 5/2009 |

OTHER PUBLICATIONS

Office Action dated Sep. 29, 2018 for U.S. Patent application No. 201480034063.7.

Adobe Indesign CS6 Manual, Adobe, Inc., Accessed on Apr. 3, 2013, helpx.adobe.com/indesign/topics.html.

Bryant et al., "Pro HTML5 Performance", Oct. 2012, Apress, p. 1-280.

CSS Generator, Design, Adobe Edge Reflow CC (Preview), Adobe, Accessed on May 8, 2013, http://html.adobe.com/edge/reflow/.

FAQ, Adobe Edge Reflow CC (Preview), Adobe, Accessed on May 8, 2013, http://html.adobe.com/edge/reflow/faq.html.

Features—Adobe Edge Reflow CC (Preview), Adobe, Accessed on Aug. 15, 2013, http://html.adobe.com/edge/reflow/features.html.

(56) References Cited

OTHER PUBLICATIONS

Features, Adobe Edge Reflow CC (Preview), Adobe, Accessed on May 8, 2013, http://html.adobe.com/edge/reflow/features.html.
Features, UX Design Tools Built by UX Designers, UXPin, Accessed May 8, 2013, http://www.uxpin.com/application-features.html.
Fetterley et al, A large-scale study of the evolution of web pages, Softw. Pract. Exper. 2003; 1:1, Jul. 2003, on World Wide Web, dl.acm.org.
Ford, Peter, "iBloc Responsive Layout", iRise Break Points, edited by Pete Indelicato on Apr. 22, 2013, Accessed on Jan. 13, 2014, http://idn.irise.com/pages/viewpage.action?pageId=18219024.
Ford, Peter, "iBloc Responsive Layout", iRise Break Points, edited by Pete Indelicato on Apr. 23, 2013, Accessed on Jan. 13, 2014, http://idn.irise.com/pages/viewpage.action?pageId=18219026.
Ford, Peter, "iBloc Responsive Layout", iRise Break Points, edited by Pete Indelicato on Apr. 30, 2013, Accessed on Feb. 7, 2014, http://idn.irise.com/pages/viewpage.action?pageId=18219027.
Ford, Peter, "iBloc Responsive Layout", iRise Break Points, edited by Pete Indelicato on Mar. 7, 2013, Accessed on Jan. 13, 2014, http://idn.irise.com/pages/viewpage.action?pageId=17564675.
Harb et al., "Responsive Web Design", Dec. 6, 2011, p. 1-30.
Home page, DivShot, Accessed May 8, 2013, http://www.divshot.com/.
International Search Report and Written Opinion dated Aug. 27, 2014 for PCT Patent Application No. PCT/US2014/035611.
International Search Report and Written Opinion dated Sep. 23, 2014 for PCT Patent Application No. PCT/US2014/035740.
Knight, "Responsive Web Design: What It Is and How to Use It", Smashing Magazine, Jan. 12, 2011, p. 1-23, http://coding.smashingmagazine.com/2011/01/12/guidelines-for-responsive-web-design/.
Marcotte, "Responsive Wed Design", A List Apart, May 25, 2010, p. 1-16, http://alistapart.com/article/responsive-web-design.
McCormack and Asente, An Overview of the X Toolkit, User Interface Software, ACM, Jan. 3, 1988, pp. 46-55.
Non-Final Office Action dated Dec. 23, 2014 for U.S. Appl. No. 13/889,329.
Notice of Allowance and Fees dated Apr. 25, 2014 for U.S. Appl. No. 14/175,921.
Notice of Allowance and Fees dated Jan. 10, 2014 for U.S. Appl. No. 14/025,745.
Notice of Allowance and Fees Due dated Nov. 22, 2013 for U.S. Appl. No. 13/968,401.
Notice of Allowance dated Mar. 16, 2016 for U.S. Appl. No. 13/889,329.
Notice of Allowance dated Mar. 15, 2017 for U.S. Appl. No. 14/176,348.
Office Action dated Apr. 1, 2015 for U.S. Appl. No. 13/889,331.
Office Action dated Feb. 10, 2016 for U.S. Appl. No. 14/176,348.
Office Action dated Jul. 18, 2016 for U.S. Appl. No. 14/176,348.
Office Action dated Mar. 24, 2014 for U.S. Appl. No. 14/175,921.
Office Action dated May 28, 2015 for U.S. Appl. No. 13/889,329.
Office Action dated Sep. 10, 2015 for U.S. Appl. No. 13/889,331.
Overview—Adobe Edge Reflow CC (Preview), Adobe, Accessed on Aug. 15, 2013 from http://html.adobe.com/edge/reflow/.
Partial Supplementary European Search Report dated Jan. 3, 2017 for European Patent Application No. 14794970.5.
Pettit, "Beginner's Guide to Responsive Web Design", Treehouse blog, Aug. 8, 2012, Accessed on Oct. 31, 2013, p. 1-35, http:/blog.teamtreehouse.com/beginners-guide-to-responsive-web-design.
Puerta et al., "The UI Pilot: A Model-Based Tool to Guide Early Interface Design", Jan. 2005, ACM, p. 215-222.
Responsive Web Design Prototyping Tool, UXPin newest solution, UXPin, Accessed May 8, 2013, http://blog.uxpin.com/1575/responsive-web-design-prototyping-tool-uxpin-newest-solution/.
Surber, The next-step in next-gen web design, Adobe Edge Reflow Team Blog, Jun. 28, 2013. Accessed on Aug. 15, 2013, http://blogs.adobe.com/edgereflow/2013/06/18/the-next-step-in-next-gen-web-design/.
Surger, Single page comps?, Adobe Edge Reflow Team Blog, Aug. 7, 2013, Accessed on Aug. 15, 2013, http://blogs.adobe.com/edgereflow/2013/08/07/single-page-comps/.
Tech Specs, Adobe Edge Reflow CC (Preview), Adobe, Accessed on May 8, 2013, http://html.adobe.com/edge/reflow/tech-specs.html.
Youtube Video: The Latest Edge Reflow CC Preview Overview http://www.youtube.com/watch?v=RDAAM0uit30&feature=youtu.be viewed on Aug. 15, 2013.
Akiba, "AniViz: A Template-Based Animation Tool for Volume Visualization," IEEE Computer Graphics and Applications, Voume 30, Sep.-Oct. 2010, pp. 61-71.
Arnold, "An Interactive Maze Router with Hints," 25th ACME/IEEE Design Automation Conference, Jun. 1988, pp. 672-676.
Backes, UMI: An Interacive Supervisory and Shared Control System for Telerobotics, 1990 IEEE International Conference, May 1990, pp. 1096-1101.
Bouillon, "Flexible Re-engineering of Web Sites," Proceedings of the 9th international conference on Intelligent user interfaces, Jan. 2004, pp. 132-139.
Chipman, "SlideBar: Analysis of a linear input device," Behaviour & Information Technology archive, vol. 23 Issue 1, Jan.-Feb. 2004, pp. 1-9.
Coversy, "Improving modularity of interactive software with MDPC architecture," Engineering Interactive Systems, Jan. 2008, pp. 321-338.
Dayringer, "Interactive program for visualization and modelling of proteins, nucleic acids and small molecules," Journal of Molecular Graphics, Jun. 1986, pp. 82-87.
Fails, "Light Widgets: Interacting in Every-day Spaces," IUI '02 Proceedings of the 7th international conference on Intelligent user interfaces, Jan. 2002, pp. 63-69.
Feuerstack, "Model-based Layout Generation," AVI '08 Proceedings of the working conference on Advanced visual interfaces, May 28-30, 2008, pp. 217-224.
Hofmann, "Profilegraph: an interactive graphical tool for protein sequence analysis," Comput Appl Biosci, vol. 8, No. 4, Aug. 1992, pp. 331-337.
Holzmann, "Building Interactive Prototypes of Mobile User Interrfaces with a Digital Pen," APCHI '12 Proceedings of the 10th asia pacific conference on Computer human interaction, Aug. 2012, pp. 159-168.
Jones, "What you Sculpt is What you Get: Modeling Physical Interactive Devices with Clay and 3D Printed Widgets," Proceedings of the 2016 CHI Conference on Human Factors in Computing Systems, May 2016, pp. 876-886.
Lam, "ART: Augmented Reality Table for Interactive Trading Card Game," VRCIA Conference Proceedings, Jun. 2006, pp. 357-360.
Myers, "Creating Graphical Interactive Application Objects by Demonstration," UIST '89 Proceedings of the 2nd annual ACM SIGGRAPH symposium on User interface software and technology, Nov. 1989, pp. 95-104.
Mzoughi, "WebTOP: A 3D interactive system for teaching and learning optics," J. Computers and Education, vol. 49, No. 1, Aug. 2007, pp. 110-129.
Ropinski, "Interactive Volume Visualization Techniques for Subsurface Data", Lecture Notes in Computer Science, vol. 3736. Springer, Berlin, Heidelberg, Jul. 2005, pp. 121-131.
Svensson, "Investigation and development of user design utilities for widget based web services", Chalmers University of Technology, Goteborg, Sweden, May 2009, pp. 1-48.
Weiss, "Madgets: Actuating Widgets on Interactive Tabletops", UIST '10 Proceedings of the 23nd annual ACM symposium on User interface software and technology, Oct. 2010, pp. 293-302.
Office Action dated Jan. 4, 2019 for Australian Patent App. No. 2014263021.
Notice of Allowance dated Nov. 14, 2019 for U.S. Appl. No. 16/106,547.
Office Action dated Jun. 7, 2019 for European Patent Application No. 14794970.5.
International Search Report dated Nov. 8, 2019 for PCT Patent Application No. PCT/US19/43848.

* cited by examiner

1100

1400

1500

VARIABLE DIMENSION VERSION EDITING FOR GRAPHICAL DESIGNS

CROSS-REFERENCE TO RELATED APPLICATIONS

This application is a continuation of U.S. application Ser. No. 14/176,348, filed Feb. 10, 2014, which is a continuation of U.S. application Ser. No. 14/025,745, filed Sep. 12, 2013, now U.S. Pat. No. 8,671,352, which is (1) a continuation-in-part of U.S. application Ser. No. 13/889,329, filed May 7, 2013, now U.S. Pat. No. 9,389,759, and (2) a continuation-in-part of U.S. application Ser. No. 13/889,331, filed May 7, 2013, all of which are incorporated by reference herein in their entireties.

BACKGROUND OF THE INVENTION

Responsive graphical design tools have risen in importance alongside the proliferation of different screen sizes used by the general public to render and consume graphical media. Responsive design tools and techniques are of particular importance for the design of web pages and web sites. As nearly every electronic device is now capable of accessing the Internet, and people are becoming less tolerant of small screen sizes serving as a hindrance to their web browsing experience, a web design process flow must take varying screen size into account from start to finish. Furthermore, media consumers expect to be able to manipulate the size of individual windows on a screen to allocate a desired amount of screen real estate to different windows based on their relative importance. As a result, the responsiveness of a graphical design must be taken into account even if the design is intended for consumption on a single device. Finally, certain devices are capable of rendering a design in different orientations such as portrait and landscape orientations. It is therefore desirable to have different versions of a design specified for each of these orientations.

Responsive web design generally involves two main steps. First a set of dimension specifications are provided by a designer. These dimensions specifications will serve either to define a target dimension at which a particular version of the design will be rendered, or as trigger points at which the design will switch from one version to another. For example, a designer may specify a version of a design for a smart phone screen with a 3.5 inch diagonal and another version of a design for a tablet screen with a 10 inch diagonal; or a designer may specify a design to switch from one version to another when a rendering space in a browser window is decreased in size below a width of 10 inches. FIG. 1 illustrates a responsive design as specified for a smart phone screen in portrait orientation 100 and in landscape orientation 101. The portrait orientation 100 and landscape orientation 101 each display different dimension versions of a single responsive design. Note that the hero image 102, title text 103, and link list 104 in portrait orientation 100 are laid out in an entirely different configuration as hero image 105, title text 106, and link list 107 in landscape orientation 101.

Regardless of how the different dimensions are selected or delineated, the increase in required design effort for the responsive design rises in proportion to the number of different sizes for which a design must be specified. For example, the work required to specify the responsive design shown in portrait orientation 100 and landscape orientation 101 may be nearly double the work required to specify a single nonresponsive design. Graphic designers and developers have found themselves faced with the difficult task of producing various versions of the same designs that are optimized for different rendering spaces. Responsive graphical design tools seek to ease the burden of specifying all of these different versions.

Related approaches to responsive graphical design have included automated procedures for modifying a design such as reducing white space between design elements, reducing font sizes, and reducing image sizes automatically as the rendering space afforded for the design is reduced. Other approaches have focused on alleviating the manual specification processes by copying the design automatically from one dimension version into an area used to specify a different dimension version of the design. For example, the design elements in portrait orientation 100 in FIG. 1 would be copied automatically by the tool into a landscape orientation design window automatically as soon as the designer requested the ability to define a landscape version of the design. The result would be something like what is shown in landscape orientation 108. The graphical designer would then be able to rearrange and resize the copied elements in the new design window to create the version shown in landscape orientation 101.

SUMMARY OF INVENTION

A computer-implemented method for allowing a user to specify a responsive web page design is disclosed herein. The method includes generating a rendering of a first dimension version of the web page for a user. The rendering includes an interactive widget. The method also includes receiving an inheritance structure specification from the user. The inheritance structure specification defines an inheritance structure in which the second dimension version of the web page is defined as a child of the first dimension version. The method also includes receiving a widget property specification for a first property of the interactive widget from the user while the user is editing the first dimension version. The method also includes storing the widget property specification for the first dimension version and the second dimension version while the user is editing the first dimension version. The interactive widget property specification would not have been stored for the first dimension version if the widget property specification had been received while the user was editing the second dimension version.

Another computer-implemented method for allowing a user to specify an interactive graphical design is also disclosed herein. The method includes receiving an inheritance characterization specification from the user. The method also includes rendering a first dimension version of the interactive graphical design. The first dimension version has a parent-child relationship with a second dimension version of the interactive graphical design according to an inheritance structure. The method also includes receiving a widget property specification for the widget from the user while the user is editing the first dimension version. The method also includes storing the widget property specification for the first dimension version and the second dimension version in accordance with the inheritance structure and the inheritance characterization.

Another computer-implemented method for allowing a user to specify an interactive graphical design is also disclosed herein. The method includes generating a rendering of a first dimension version of the interactive graphical design in which a widget appears. The widget has an existence property. The existence property has a placed value for the first dimension version. The method also includes storing an unplaced value for the existence property of the widget in a second dimension version.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1:
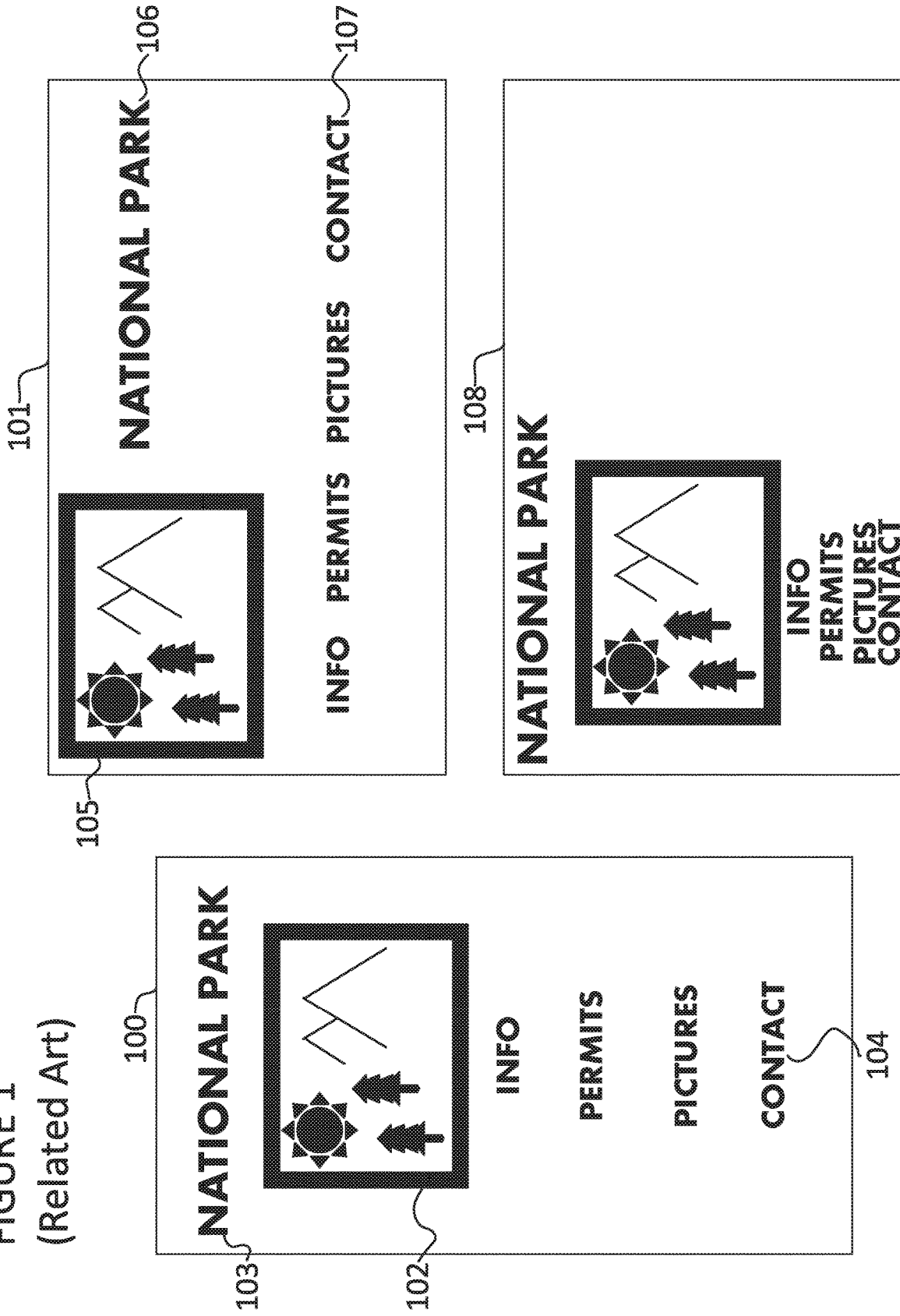
FIG. 1 illustrates different versions of a responsive graphical design as found in the related art.

The invention relates generally to responsive graphical design, and more specifically to the design of responsive web page prototypes. As described above, responsive graphical design creates additional work for the graphic designers in proportion to the responsiveness of the design. In the solutions described above with reference to FIG. 1, the landscape design was copied into the area used to specify the portrait design. This approach might save time in the initial set up process for each design size. However, after the copying step is completed, all the benefits to efficiency attributable to those solutions will have been expended. If, at a later time, a project manager decides that a design element needs to be modified, the modification will need to be manually conducted on each of the separate designs. For example, if a manager decides that the title text on each page should be green instead of black, a graphic designer will have to load the landscape design 101, modify title text 106, load portrait design 100, and modify title text 103.

Embodiments of the present invention alleviate the problem described above by making each design element a single editable entity across the entire design. As such, a designer would only need to change title text 106 from green to black, and title text 103 would also change because they are the same object viewed at different sizes. This benefit is compounded by the use of responsive masters that propagate changes to multiple pages of a design with a single edit. In keeping with the example of FIG. 1, it is likely that hero image 105 and title text 106 remain on every page of the web site. Embodiments of the present invention allow for the usage of a master that would include these design elements on each page of the website and would allow any modification of the master to propagate to every instance of the master on all the other pages of the design.

The benefits described in the preceding paragraph are provided, at least in part, through the use of responsive widgets, masters containing responsive widgets, and masters that are themselves responsive. Responsive widgets can be added into a design and are specified such that there characteristics can have various states for various dimension versions. Since the same widget is rendered in each of the dimension versions, an edit made to the widget at one design size can be propagated automatically to all of the other dimensions. Embodiments of the invention also allow a user to limit a particular modification from affecting the widget at other dimension versions by providing methods of switching between all-dimension, one-dimension, and multi-dimension editing modes. Embodiments of the invention also allow a user to set an inheritance structure for a design that determines what dimension versions of a design will be affected by a change made to a particular dimension version. Associated embodiments also allow a user to set an inheritance characteristic for a design that can determine which properties of widgets will change across dimension versions when a change is made to a particular dimension version. The properties can include an existence property which sets whether or not a widget is placed or unplaced in a given dimension version. The existence property should not be confused with properties that allow a widget to be hidden or visible depending upon the rendered state of a dimension version in a player. If a widget is unplaced, it cannot be made visible in the dimension version at all. If a widget is hidden, it is located in the dimension version but it is not visible until an event occurs to make the widget visible. In addition, masters can be included in the design to propagate changes through different pages of a design. The masters may also include responsive container widgets that are configured to store different widgets on different pages of the same design. Masters serve to limit design efforts associated with responsive web design because a modification made to one object in a graphic design can be automatically propagated to a multitude of instances of the object. Finally, responsive masters can be added into a design and are specified such that their characteristics can have various states for various dimension versions.

In related approaches, a design is made responsive through the use of media queries. Media queries are embedded in the code of a web page and are known to standard web browsers. A browser will recognize the media queries when rendering a page, and load a specific style sheet for the design when the media query is affirmatively evaluated by the browser. The media query can specify a particular width for a rendering space, a particular height for a rendering space, a color rendering capability of a device, etc. If the rendering space provided by a browser rendering the design meets any of the specified characteristics, a particular style sheet can be loaded in response to alter the design. For example, a media query could be set to lower the font size associated with a particular widget if the width of the screen being used to render the design decreased below a certain predefined width. Media queries offer a way to provide responsiveness to a design that is already built in to hypertext markup language (HTML) and cascading style sheets (CSS). However, media queries are somewhat limiting because they can only be used to adjust a style sheet. As a result, they do not provide for more involved responsive web design such as the ability to alter the interactivity of a design element.

Embodiments of the present invention provide web site designs with responsive characteristics through the use of object model event handlers that allow users to produce web site prototypes with a more involved degree of responsiveness. The object model event can treat the web page as its object and can listen to the resizing of the page. If the page is resized, the object model event can trigger an event handler in the form of a script that modifies any desired characteristic of a design element. For example, the script could be a javascript used to change the URL of a web page that a widget links to. In other words, a widget could link to one page when it is rendered in a first dimension version and link to a different page when it is rendered in a second dimension version.

In related approaches, elements in a design are made responsive by stacking elements in the rows and columns of a grid, specifying margins for the grid, and then making the margins and row/column locations responsive. For example, the specification for the title text 106 in landscape design 101 in FIG. 1 would be defined as: column 2, row 1, margin 33%; whereas the specification for the title text 103 in portrait design 100 would be: column 1, row 1, margin 50%. For more complex examples, the effort associated with keeping track of the relative positioning inputs becomes prohibitively difficult—particularly for graphic designers that are less technically inclined.

Embodiments of the present invention provide web site designs with responsive widgets that respond based on a predefined absolute position of where the widget should be located on a web page. The resulting scheme for specifying widget locations is much more intuitive than one based on relative positioning and makes the design of interactive responsive web design much easier on the designers and developers involved. The absolute positions can be specified in terms of x- and y-coordinates using various possible units including metric distance units such as centimeters, US distance units such as inches, and design-specific units such as pixels.

Design Environment: Responsive Interactive Widgets

Embodiments of the present invention provide tools and methods for specifying a responsive graphical design. In specific embodiments of the invention, the responsive graphical design can be a responsive web page prototype. The graphical design tool can allow a user to specify design elements such as widgets for inclusion in the graphical design. The widgets can be interactive. The graphical design tool can also allow a user to specify dimension specifications for the design.

Dimension specifications refer to rendering space dimensions and are used by the responsive design to determine which dimension version should be rendered given a particular available rendering space. A dimension specification can serve as a trigger point that defines a dimension at which the design switches from being rendered according to one dimension version to being rendered according to another dimension version. For example, a dimension specification could specify a browser window width of 5 inches, and could be used by the responsive design to render a first dimension version when the browser window width was less than 5 inches and a second dimension version when the browser width was greater than 5 inches. A dimension specification can also serve as a target dimension that defines a specific set dimension at which different dimension versions of the design should be rendered.

Once a user has specified at least one dimension specification and at least one widget, the graphical design tool can allow a user to specify different states for the widget for different dimension versions of the design. In other words, the widget may have a first state in one dimension version of the design and a second state in another version of the design. The transformation of the widgets and design elements from one state to another is what provides the design with its responsiveness. Examples of these tools and methods are described below with reference to FIGS. 2-5.

Figure 2:
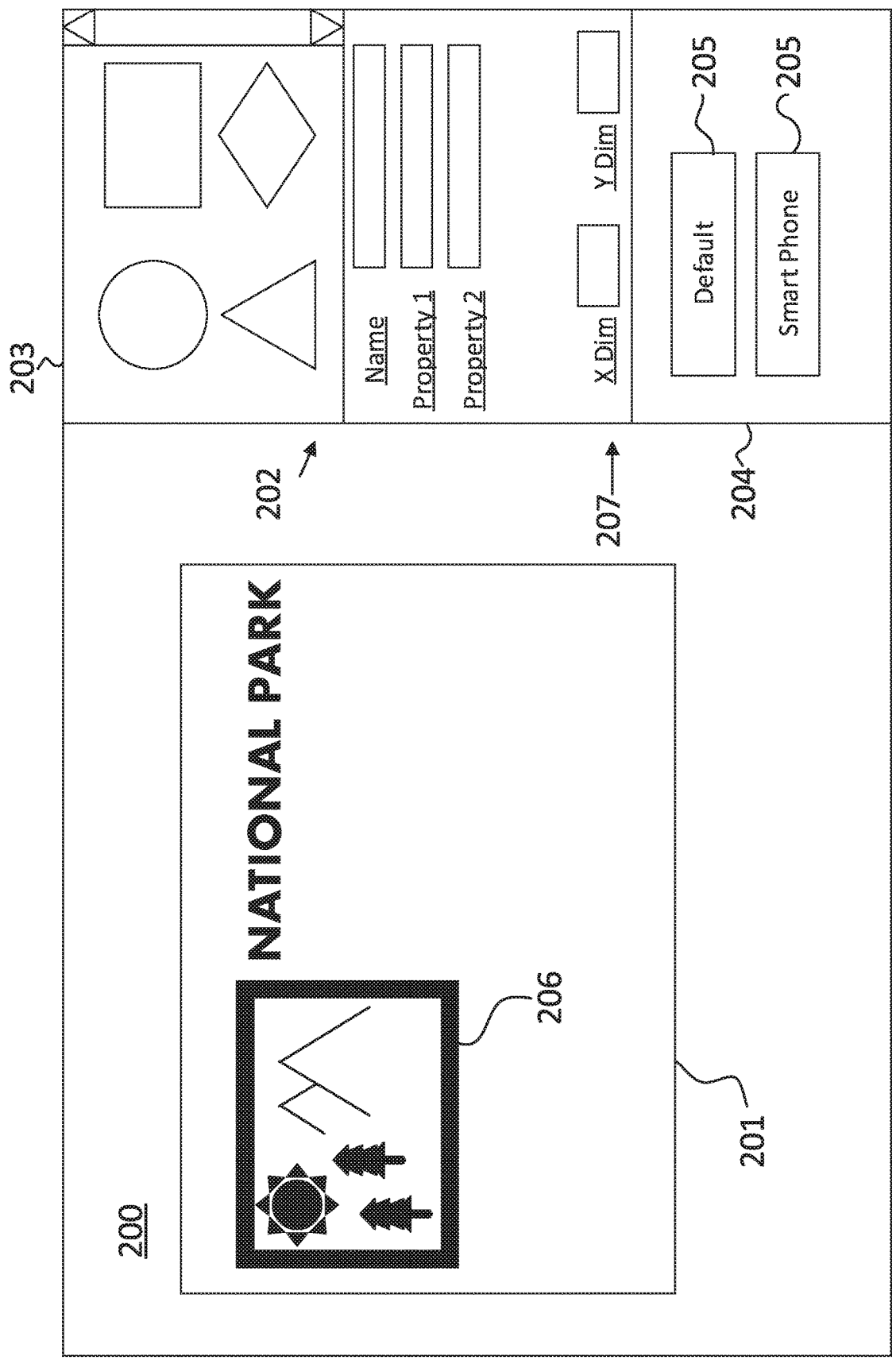
FIG. 2 illustrates a graphical user interface for a graphic design tool that is in accordance with embodiments of the present invention.

A tool for designing a responsive graphical design can be described with reference to FIG. 2. FIG. 2 illustrates a graphical design environment 200 that allows a user to specify a responsive graphical design. Graphical design environment 200 includes a window 201 for displaying a rendering of the responsive graphical design. In specific embodiments of the invention, window 201 will be configured to display the various specified dimension versions of the design. For example, the window could be used to display a Smart Phone dimension version of the design and then be used to display a Tablet dimension version of the design. However, the design environment could also include a gallery of windows that simultaneously displayed a version of each dimension version of the design. A user could also be able to add and remove different dimension versions from the gallery at will. The tool could also add a dimension version to the gallery automatically each time an additional dimension specification was added to the design.

Graphical design environment 200 also includes a widget interface 202. The widget interface allows a user to add a widget to the window 201. A widget can be any design element associated with the design including a button, a pull-down menu, a hyperlink, a text box, or a page. In specific embodiments of the invention, the widget can be added by dragging and dropping a widget from widget menu 203 into window 201. The widget interface also allows a user to specify states for a widget by providing values for specific properties. A widget state is defined by a set of values for each of that widget's properties. In specific embodiments of the invention, the values can be entered via text inputs to widget interface 202. However, widgets could also be added using a drop down menu or through the use of keyboard commands. The values for specific states could be provided in a separate interface as in FIG. 2 or they could be specified directly in a window such as window 201 by a user clicking on a specific element to bring up an interface in window 201 itself. Such a selection could utilize a special selection action such as a right-click with a mouse or the depression of a special key during selection of a widget to distinguish the selection from a standard selection in which the widget is positioned in window 201.

Graphical design environment 200 also includes a dimension specification interface 204 that allows a user to specify a dimension or set of dimensions to be used to delineate various dimension versions. In specific embodiments of the invention, the dimension specification interface will include buttons 205 to select different dimension versions. As shown in FIG. 2, a user is able to choose between a Smart Phone dimensions version and a Default dimension version by selecting different buttons 205. In specific embodiments of the invention, when these buttons are selected, window 201 will display the selected dimension version. When the design appears in window 201 it will be rendered according to that dimension version. In specific embodiments, the dimension version that is displayed in window 201 will generally be the dimension version to which edits to the design are applied as they are received from the user. As shown in FIG. 2, dimension specification interface 204 includes two dimension versions: Default and Smart Phone. These dimension versions and others may be available in the design environment before a user begins specifying a design. However, dimension specification interface 204 may also allow users to specify and add additional dimension specifications and create additional dimension versions. Furthermore, a user may begin specifying a design before any dimension specifications are received such that a design may be completely specified in a non-responsive state before dimension specifications are added to a dimension specification interface and the responsive design processes ensues.

Additional dimension specifications and dimension versions can be added in various ways. The user could enter the dimension values textually into a dimension specification interface and then click an entry button to store the dimension specification. The entry of a dimension specification could automatically create a corresponding dimension version. The dimension specification interface could also allow users to label each dimension version. The dimension specification interface could also provide users with a predefined set of dimension versions such as a Smart Phone target size, a Tablet target size, and a Desktop target size. The dimension specification could also allow users to specify a dimension specification based on a current size of a window such as window 201. In embodiments in which window 201 is an adjustable window, the user could adjust the size of window 201 to a given size and then enter a command in a dimension specification interface to store a new dimension specification based on the current size of the adjustable window. Using FIG. 2 as an example, a ruler could be displayed along the edge or edges of window 201 to display the current size of the window as it is being adjusted to facilitate this process. The rulers could alternatively be placed on the edge or edges of the graphical design tool 200 to serve the same purpose. The saved dimension specification could be a scaled version of the actual size of the adjustable window. The scaling factor could be configurable by the user.

Widget interface 202 may allow a user to specify states for each widget in a design and associate each of those states with a particular dimension version. A state can be associated with a different dimension version in various ways. For example, a user could specify that hero image 206 will appear at a specific set of x- and y-coordinates on the web page in a first state, and a second set of x- and y-coordinates on the web page in a second state. This particular specification could be accomplished using an absolute position specification interface 207. The absolute position specification interface could have an x-input and y-input used to specify the location of the widget in the design for a given dimension version. However, the inputs do not need to be in separate entries as shown in the FIG. 2 as both could be input at a single prompt separated by a comma or another indicator. Furthermore, the absolute position interface could have numbers that are automatically filled out as a widget is visually positioned in a design window. The specified absolute position of the widget can be associated with a particular dimension version by providing duplicate fields for individual widget properties in widget interface 202 and labeling the duplicate fields with the dimension version they are associated with. The specified absolute position of the widget could also be associated with a particular dimension version by switching window 201 and widget interface 202 so that they instantaneously only reflect the dimension version that is currently being viewed and edited. Any edits made to a widget would then be applied to that particular dimension version until another version was selected. Finally, a state could be associated with a particular widget through the use of the gallery display approach in which edits made to the sub-window displaying a particular dimension version would be associated with only that dimension version. In these situations, the graphical design environment could include multiple widget interfaces 202 associated with the various sub-windows for particular dimension versions.

Although the example of an absolute position property was used in the previous paragraph, the various methods of associating a property with a specific dimension version described above apply to other properties. Widgets added to a design using widget interface 202 can have various responsive user definable properties. These properties can all be configured to be responsive by defining different values for the properties in different dimension versions. For example, a text property of a widget could be set such that the widget's text content was "Click Here to Login with Password" in a tablet dimension version, and "Login" in a Smart Phone dimension version. As described in the previous paragraph, the widget interface 202 could allow a user to specify an absolute position for the widget at a given dimension version. Furthermore, the widget interface 202 could also allow a user to specify different colors, font styles, image resolutions, line weights, rich text formatting, relative positioning, and any property that can be defined in a CSS style sheet for a widget. The widget interface 202 could also allow a user to specify a different text content for a widget at different dimension versions. For example, a text box containing a large amount of informative text in a large dimension version could be condensed to a summary format in a smaller dimension version. Finally, the widgets could have an existence property used to keep track of whether or not the widget appeared at all in a given dimension version. The value for the existence property could be a binary value indicative of a "placed" state or an "unplaced" state. As stated above, the existence property is distinguishable from a hidden property or a visible property even though such properties can also have binary values that affect whether or not a widget appears in a given dimension version.

The user definable properties specified using widget interface 202 can also be event handlers and associated interactive properties. Interactive properties include the ability to provide additional information in response to a user input and generally responding to stimulus from a person utilizing the design. These properties could be made responsive. For example, a widget could link to one page in one dimension version, and link to a different page in another dimension version. As another example, the widget could either contain a link or be completely non-interactive at different dimension versions. Event handlers could be added to the widgets to facilitate their interactive properties, and the event handlers could be made responsive to facilitate the responsiveness of those interactive properties. For example, the widget could be a button with a "show panel A" event handler and a "show panel B" event handler for its OnClick event, and panel A could be displayed when the button is clicked while the player was a certain size and panel B could be displayed when the button is clicked while the player was at a different size. Further, the event portion of the event handlers could be made responsive such that the widget would execute a certain action upon an OnClick event in one dimension version, and execute the same action upon an OnMouseEnter event in another dimension version. In either case, the event handlers could also be conditional on the dimension version being rendered regardless of the size of the player.

All of the widget properties described above can be specified in various ways. For example, the widget specification interface 202 can change its appearance such that it can be used to specify any property that is modifiable on a particular widget. For example, if the widget were a text box, the widget specification interface could change to include an input field for typing in the text to appear in the text box. Many of the properties for the widgets could also be specified in window 201 directly. Keeping with the example of a text box, a user could select a text box that was already in the window 201 and be provided with a cursor in the text box to begin specifying the text directly in the text box itself. A user could also possibly right click on a widget in window 201 or use some other unique selection mechanism to bring up a list of properties for the widget that can be specified directly on the widget. With specific reference to the existence property, the value could generally also be defined using widget interface 202. However, in embodiments where widget interface 202 only displayed the properties of the widget for a single dimension version, and/or only reflected the state of a currently selected widget, the value for the existence property of a widget would preferably be specified using an alternative interface. In these embodiments, an unplaced widget would not be accessible for selection so it would not be possible to access the existence property via widget interface 202, and a separate interface would be required.

The dimension specifications can take on various forms. Dimension specifications could be equivalent to a width of an area afforded to render a design, a height of an area afforded to render a design, both a height and a width, a diagonal dimension, and any other dimension or set of dimensions that could be associated with a space afforded to render a design—including a scalar value for the area of the space itself. The wide assortment of dimension specifications is important because of the large number of players that designers must consider when specifying a design. For example, if the only value allowed was a scalar value for the area of the rendering space, a user would not be able to create a design that was responsive to a screen with variant orientations (e.g., a smart phone that can display a design in portrait or landscape mode that has the same total area in either situation).

The relationship between dimension specifications and dimension versions can take on various forms. As described above, a dimension version can be added to the design every time a dimension specification is specified. The dimension specification could then serve as a target dimension for that dimension version. For example, the Smart Phone dimension specification could serve as a target dimension for the Smart Phone dimension version such that when the design was rendered at the precise Smart Phone dimension specification, the Smart Phone dimension version would be rendered. As another example, the Smart Phone dimension specification could serve as a trigger point or threshold dimension such that any time the design was rendered on a device having a relevant rendering space dimension that was less than the Smart Phone dimension specification, the Smart Phone dimension version would be rendered instead of the Default dimension version. If multiple dimension specifications were added, and each was associated with a different dimension version, the dimension specifications could serve as multiple threshold dimensions or trigger points such that the design would be rendered in the largest version for which the device's relevant rendering space dimension was less than the dimension specification for that version.

In approaches that followed the rule articulated at the close of the last paragraph, the dimension specifications could be treated such that if a dimension were not specified, it would be assumed to be infinite. The Default dimension version would therefore not need to be associated with a particular dimension specification as infinity would be the assumed value. In addition, dimension specifications having multiple inputs, such as one that required both a width and a height, could still operate given this approach even if only a single dimension was specified. For example, if the dimension specification included a width of 3 inches, but the user did not include a height value, then the design would operate as if the height value were infinite and would only be responsive based on the width value.

The manner in which the dimension specification and dimension versions are related by the graphical design could be configurable by the user. For example, the user could specify that a given dimension specification is a target dimension and the associated dimension version should only be rendered when an available rendering space is equal to the size specified by the dimension specification. A user could also specify that a given dimension specification is a trigger dimension such that any time an available rendering space exceeded the size specified in the dimension specification the associated dimension version should be rendered. Contrarily, a user could specify that an associated dimension version should be rendered only when an available rendering space was less than the size specified in the dimension specification.

A method 300 for allowing a user to specify a responsive design can be described with reference to FIG. 3. In step 301, a graphical user interface is provided to a user that displays a page of a design. The graphical user interface could be the same as graphical user interface 200 described above. In step 302, a widget characterization interface is provided to the user to allow them to add an interactive widget to the page. The widget can be added to a default dimension version. In step 303, a characterization is accepted from the user to be associated with the interactive widget in a default dimension version. In step 304, a dimension specification interface is provided to a user to allow the user to specify a second dimension version. The specification interface in step 304 could accept a specification via a manual input dimension specification and the automatic creation of an associated dimension version, the selection of a default or previously user-defined dimension version, or through the adjustment of an adjustable window and the selection of the instant window size as a dimension specification and the automatic creation of an associated dimension version. In step 305, a second characterization for the widget is accepted from the user to be associated with the interactive widget in the second dimension version. Steps 304 and 305 could be executed multiple times to allow a user to specify multiple dimensions versions and to provide different characterizations for a widget in each specified dimension version. However, the widget does not need to have different states for each dimension version and as a result step 305 could be skipped for particular iterations. Accepting steps 303 and 305 could be accomplished through the use of a computing system that receives inputs from a user and routes them to a processor where the characterizations are associated with the interactive widget. The computing system could route the input from the user in an intra-computer routing network, a local area network, the Internet, or any computing system network. The computing system could be the computing system discussed below in FIG. 14.

Figure 3:
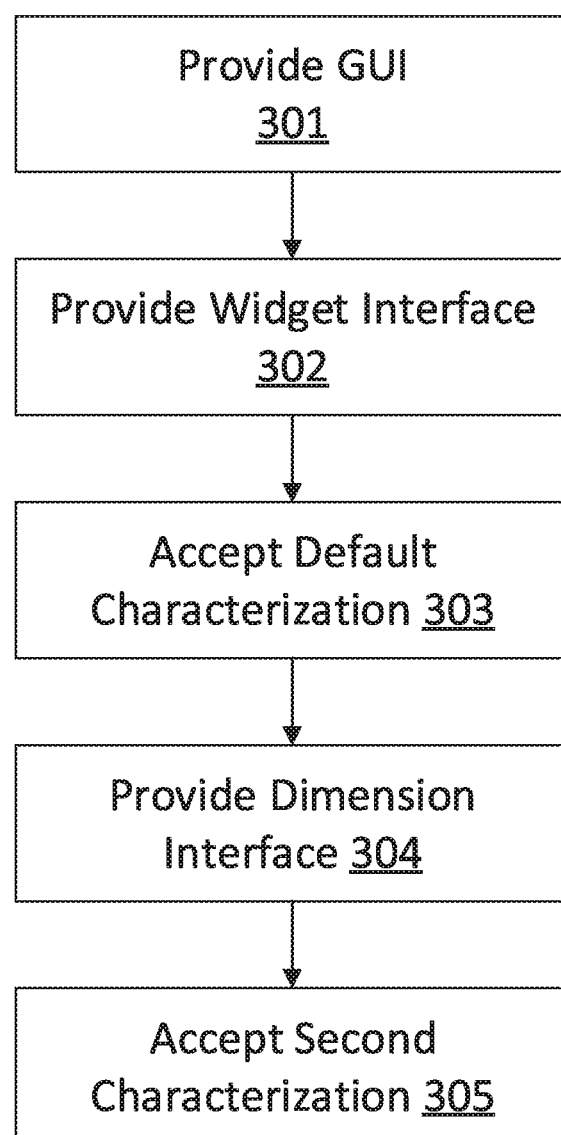
FIG. 3 illustrates a flow chart of a method for allowing a user to specify a responsive design that is in accordance with embodiments of the present invention.

The target dimensions in the method of FIG. 3 could be used by a final design specified in the design tool to select which states are to be applied to the widgets in the design when the design is rendered. For example, if a browser rendering a design had a screen size with a relevant dimension associated with the second dimension version, the interactive widget would be rendered in accordance with the second characterization. Then, if the browser's screen size was adjusted so that it had a relevant dimension associated with the default dimension version, the interactive widget would then be rendered according to the other characterization.

Figure 4A:
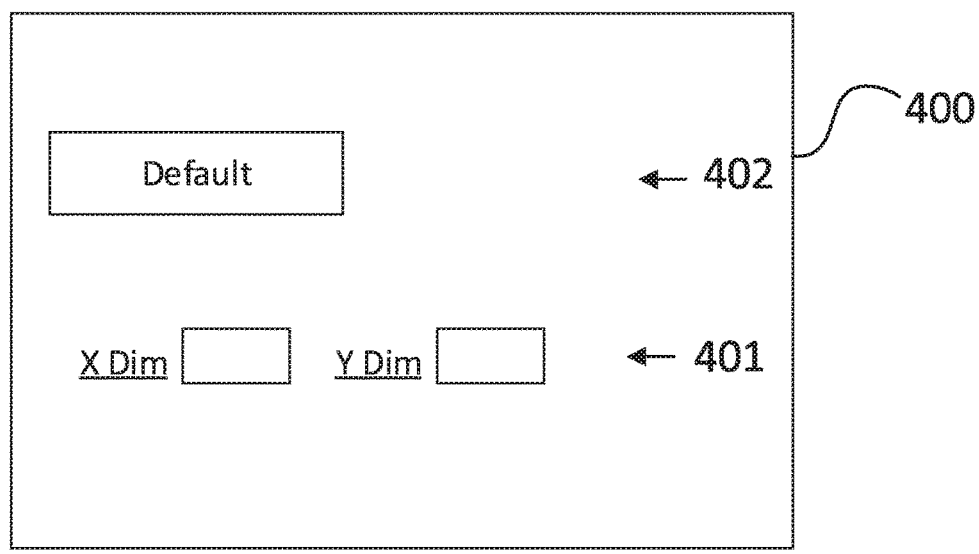
FIGS. 4a-b illustrate graphical user interfaces for a graphic design tool to illustrate certain aspects of embodiments of the present invention.
Figure 4B:
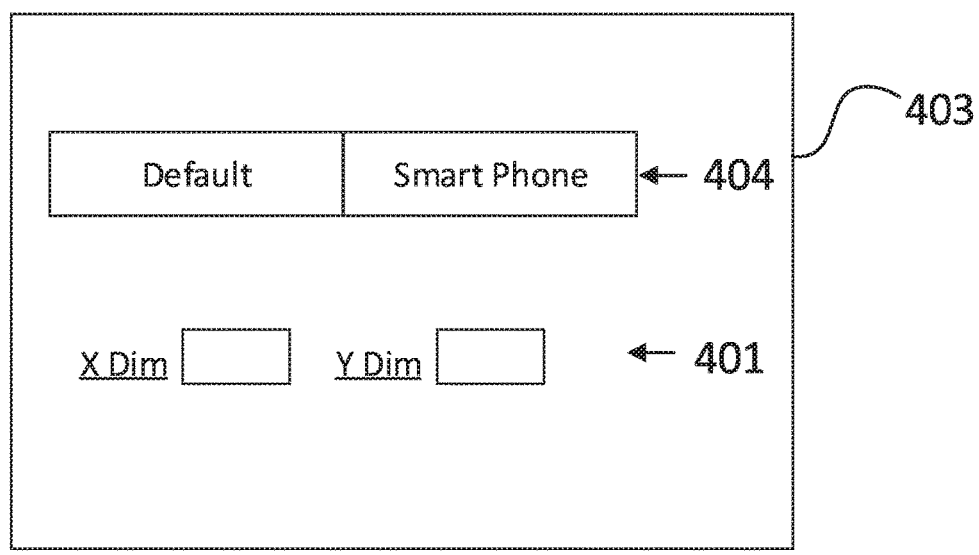
Figure 5:
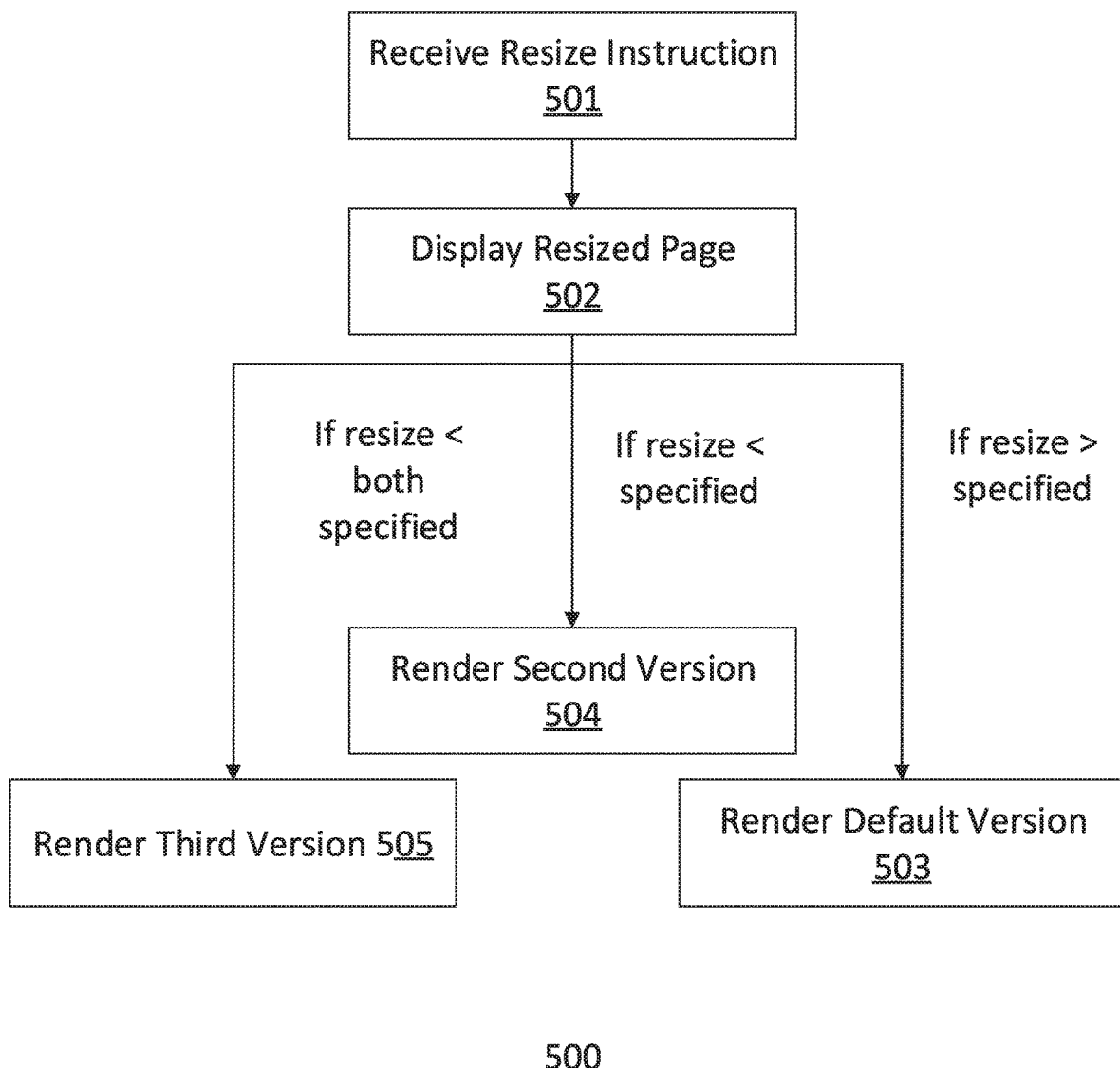
FIG. 5 illustrates a flow chart of a method for displaying the responsiveness of a design that is in accordance with embodiments of the present invention.

A specific example of how the method described with reference to FIG. 3 could operate with a specific graphical user interface can be described with reference to FIGS. 4a and 4b. FIG. 4a displays a graphical user interface 400 comprising a widget characterization interface 401 and a dimension specification interface 402. In this example, the widget characterization interface is an absolute position specification interface configured to accept x- and y-coordinates for the widget. Interface 401 would be provided to the user in step 302 above. The absolute position could be specified using an x- and y-coordinate entered by the user into widget characterization interface 401 and accepted in step 303. In step 304, the dimension specification interface could be provided to the user in the form of dimension specification interface 402 or 404. If the specification interface 402 was provided to the user, another portion of the specification interface would be necessary for the user to add the "Smart Phone" button to allow the user to select a different dimension specification. This button could be added by any of the methods described above including selecting from default sizes already known to the tool or specifying the new dimension specification manually. Once selected, the button "Smart Phone" could switch the editing and viewing mode to that dimension version. Then, in step 305, a second characterization in the form of a second absolute position of the same widget could be defined using the same interface 401 as was used in step 302 to specify a new set of x and y coordinates for the widget at the "Smart Phone" size.

The characterizations of the widget that are specified according to the method in FIG. 3 above can be stored at the same location in a computer memory. The default and second characterizations of the widget can be stored in a computer memory after being accepted from a user in a step of storing the default and second characterizations in a memory. Furthermore, for properties that are not specified as having different values in the different dimension versions, the value for the property can be stored in the same location in memory. For example, a button that has a text property with text content that changes from one dimension version to another and an absolute position that changes as well, could have a color property that stays the same regardless of what dimension version the button is rendered in. In that situation, the value for the color property for that widget could be stored in the same location in memory and the property would be common for the different states of the widget.

Once a widget has been specified to have multiple states for multiple dimension versions in a design, how the widget responds to various dimension specifications can be verified while in the tool. A method 500 for displaying the responsiveness of a design in the tool according to the various dimension specification can be described with reference to FIG. 5. The methods of FIG. 5 can begin immediately after the specifications have been received as described in FIG. 3, or it can begin after the two widget states have been received according to any other method. In step 501, a resize instruction is received from the user. For example, the resize instruction can be received from the selection of a button, the selection of an entry in a pull down menu, or by clicking and dragging a window adjustor input to resize a window. The resize instruction will resize the page such that it has a resized dimension. In step 502, a resized version of the page is provided to display to the user in response to the received resizing instruction. In the simplest case, the resized dimension will not alter the relationship of the tool display to the dimension specifications. As a result, the widgets in the design are rendered without modification.

In embodiments where a dimension specification is used as a threshold—where one dimension version of the design is rendered below the threshold and another is rendered above the threshold—an interactive widget will be rendered with one characterization if the resized dimension is larger than the dimension specification, and another characterization if the resize instruction selects a dimension that is smaller than the dimension specification. For example, in the method displayed in FIG. 5 the method will move to step 503 if the resized dimension is larger than the dimension specification and will move to step 504 if the resized dimension is smaller than the dimension specification. The design will be rendered in accordance with a default dimension version in step 503 and a second dimension version in step 504. Note that if a second dimension specification had been specified previously, the characterization displayed could depend on the relative sizes of the two dimension specifications. For example, in the method displayed in FIG. 5 if the second dimension specification were less than the first dimension specification, the method would move to step 505 if the resized dimension is less than both of the dimension specifications. In step 505 the design would be rendered according to a third dimension version associated with the second dimension specification.

In embodiments of the present invention where different states are specified for widgets in various dimension versions, certain benefits accrue as compared to the related art. In particular, the fact that the same widget exists as part of the design in each of the dimension versions facilitates the modification and creation of the design. Used in combination with the different size editing modes described below, editing the entire design can be done easily by editing the widget in a single dimension version and having the edit selectively propagate throughout the design. In specific embodiments of the invention, this is facilitated by storing characterizations for the widget at common locations in a memory. The memory will store the widget along with a set of values for properties of the widget in the first state and second state. Particular values for a property of the widget that is the same in the first state and second state will be stored at a single location in memory. By applying this method and other approaches, the widget will be treated as a single unitary element by the computer system used to provide the design environment, thereby providing efficiency to both the design process and the computer resources needed to store the widgets used in the design.

Design Environment: Responsive Masters

In specific embodiments of the invention, the design environment will allow users to add masters to their designs. The masters may contain widgets that are specified within the master. The widgets may be responsive. Masters can serve as templates for any design element that needs to be repeated multiple times in a design. For example, a design's header, footer, and navigation content are often presented on multiple pages of the design to provide the design with a unified look and feel and to allow for easier access to the various portions of the design. However, masters can also be used to facilitate the editing of something as simple as a single image that is placed in various locations in a single design. Masters are well suited to the task of managing a responsive design because they allow for edits to be easily propagated through the design. As mentioned previously, responsive graphical design compounds the amount of design work that needs to be done for the entire design, so the ability of masters to allow for centralized management of these design efforts is therefore beneficial. Tools and methods for specifying a design using masters with responsive widgets can be described with reference to FIGS. 6-9f.

Interfaces similar to the one described with reference to FIG. 2 can be used to specify a design using masters with responsive widgets. The masters can be selected from an interface and dragged into a design, or they can be specified through other means such as a combination of short-cut keys. However, masters can also individually be specified in their own separate design windows, and then be pulled in to the main design window after they have been fully defined. A user-defined master template definition can likewise be saved so that it can be easily retrieved and brought back out into the design space. Finally, although the discussion below is generally directed to masters that can be pulled into pages of a design, the teachings herein apply equally to masters that serve as pages of a design themselves.

Figure 6:
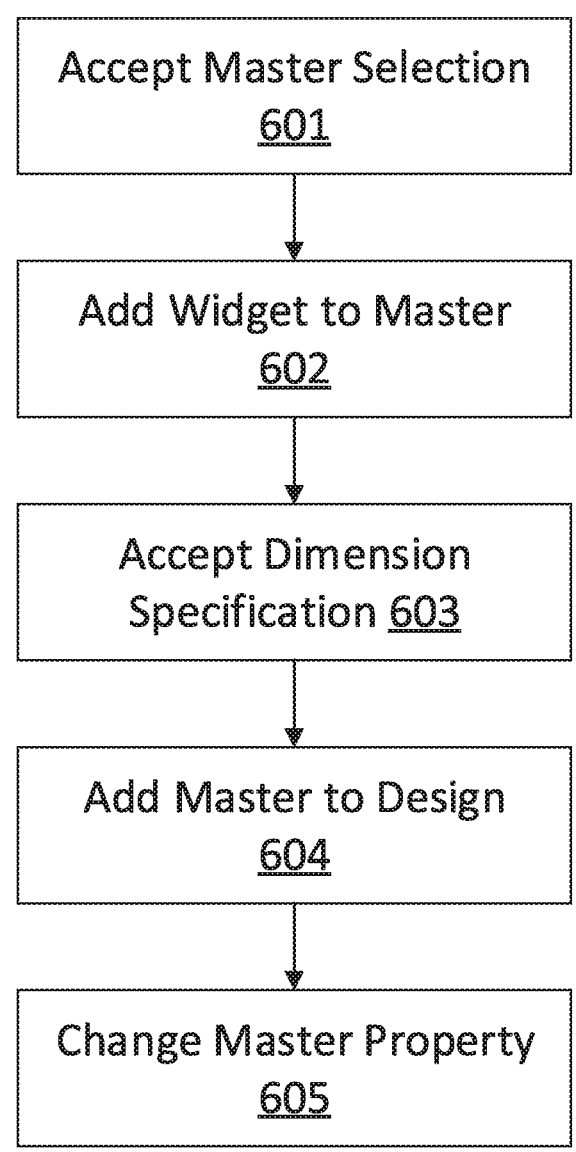
FIG. 6 illustrates a flow chart of a method for specifying a design using masters with responsive widgets that is in accordance with embodiments of the present invention.

A method 600 for specifying a design using masters with responsive widgets can be described with reference FIG. 6. In step 601, a master selection is accepted via a communication system from a user. The master selection can be of a predefined master or it can involve the separate specification of a new master and the selection of that master from a customized library. In step 602, a widget is added to the master with a specific characterization. In step 603, a dimension specification is accepted from the user via a routing system. The master can then be viewed by the user in a different dimension version and the user can choose to specify a second characterization to the same widget. In step 604, an instance of the master can be added to various pages in the design. In step 605, a property of a widget in the master can be changed which will be automatically applied to all of the various pages in the design. For example, the color of a widget's border could be changed, and the change would be propagated through to every page on which the master appeared.

Figure 7B:
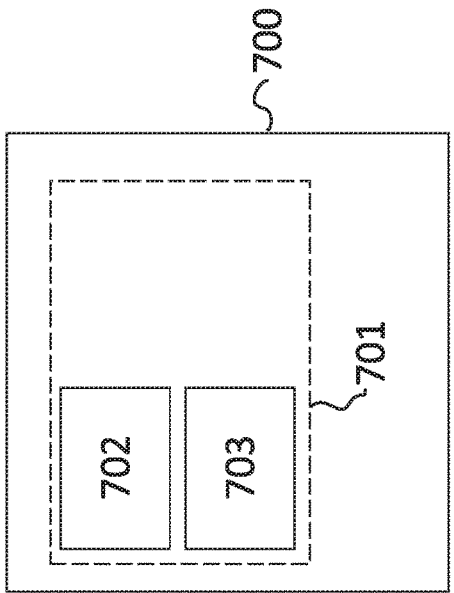
FIGS. 7a-d illustrate different versions of a responsive graphical design to illustrate certain aspects of embodiments of the present invention.
Figure 7D:
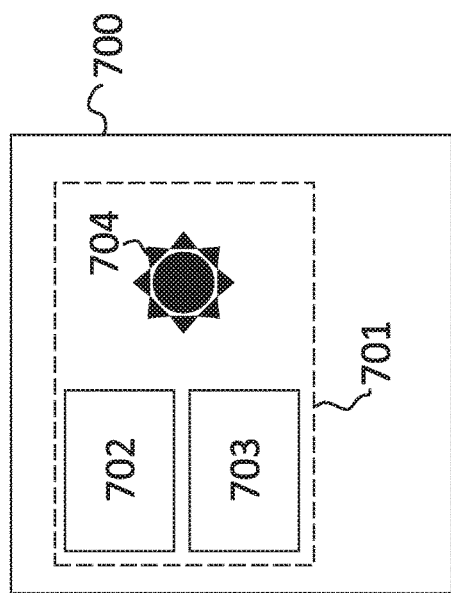
Figure 7A:
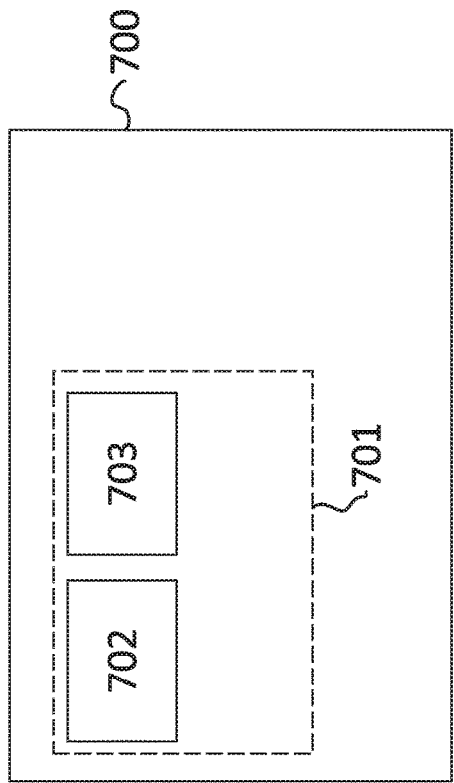
Figure 7C:
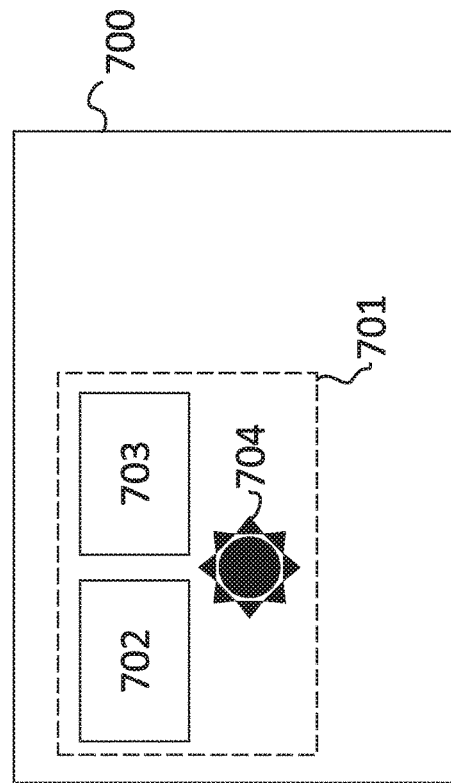

An example of how this method can improve the design process for responsive designs can be described with reference to FIGS. 7a-d. FIG. 7a displays a web page 700, a master 701, and two widgets 702 and 703. As described above, the widgets 702 and 703 were placed within master 701 and may have been specified in a separate design window from web page 700. In this situation, widgets 702 and 703 are text elements that need to appear consistently in the location on web page 700 taken up by master 701 across multiple pages in a design. In other words, numerous pages in the design involve text located in the upper left corner of the web page in the orientation shown. FIG. 7b displays the same web page after it has been resized to a narrower size. Note that master 701 has not changed its location, but that widgets 702 and 703 are now located in different positions relative to each other. This is because the widgets responded to the adjustment in the web page size as previously specified by the designer. FIGS. 7c and 7d illustrate the same web page and widgets, but also include image 704. This edit was made to the master (i.e., an image was added to the master) after the designs in FIGS. 7a and 7b were specified. The benefit of this approach arises from the fact that image 704 will be included throughout the design everywhere that the master is located which significantly decreases the editing required to implement the modification.

Widgets and dimension specifications can be specified for a master in the same manner that they are specified in a design generally. Notably, the position of the widget can be specified relative to the master in a proportional offset from a center or corner of the master, or through the specification of an x- and y-coordinate of the widget where the coordinate system is defined with respect to the master. Furthermore, the editing methods used to specify the characteristics of a master can overlap the editing methods used to specify the characteristics of a widget to a certain degree.

In specific embodiments of the invention, the masters themselves can be responsive. For example, a master used as a header may be modified to change the shape, appearance, and content of the master as the width of a page decreases. Since the header needs to appear on every web page, and headers generally span the entire width of a web page, they are particularly well suited to being treated as masters in a design. However, the benefits associated with responsive masters are generally applicable to any design element that is used repeatedly even if it is only used multiple times on a single page of the design.

Figure 8:
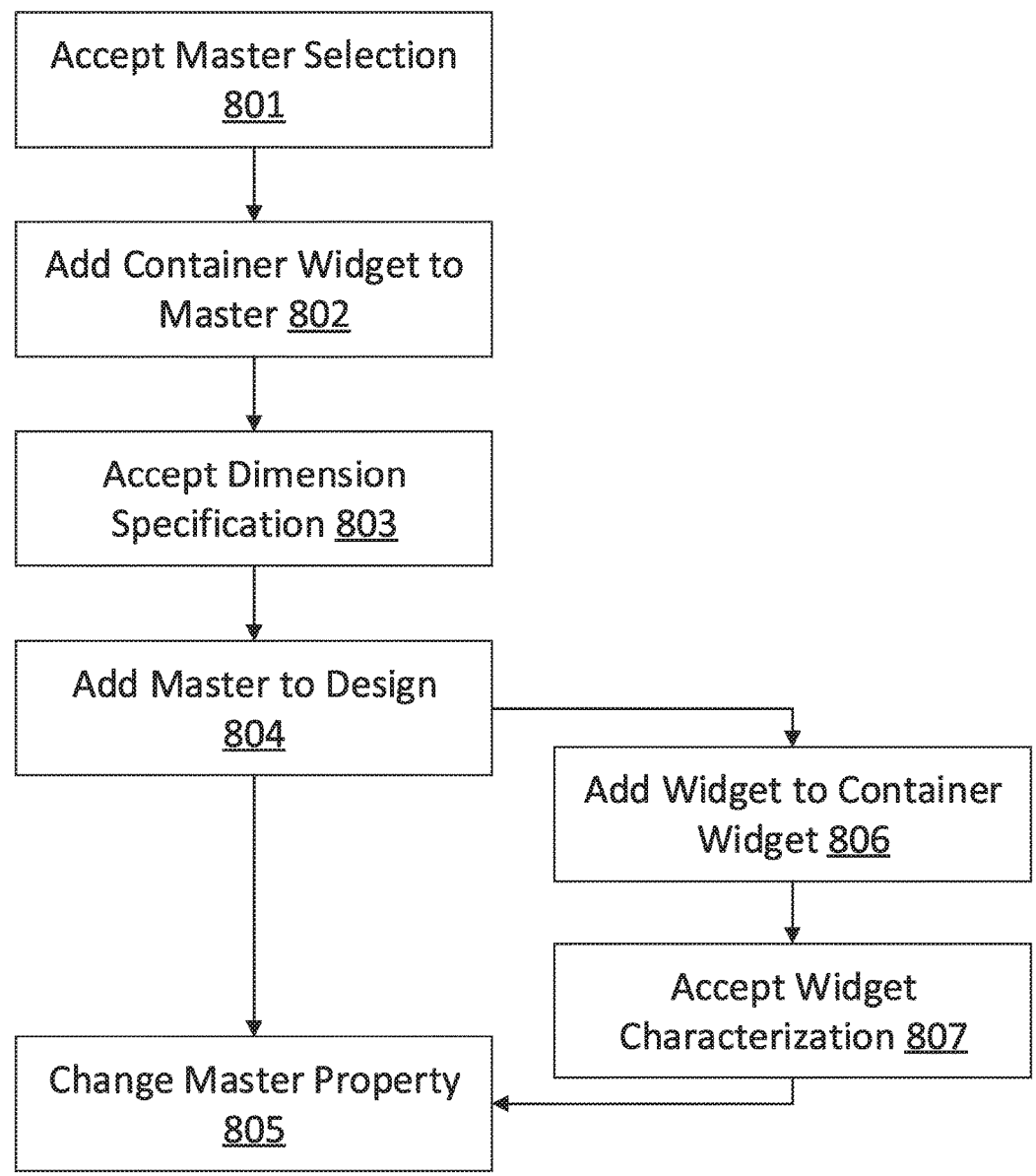
FIG. 8 illustrates a flow chart of a method for specifying a design using container widgets in masters that is in accordance with embodiments of the present invention.

The use of responsive container widgets and masters in a design environment provide additional benefits that can be described with reference to FIGS. 8 and 9. FIG. 8 illustrates a method 800 for specifying a design using container widgets in masters. In step 801 a master selection is accepted via a routing system from a user. The master selection can be of a predefined master or it can involve the separate specification of a new master. In step 802, a container widget is added to the master with a specific characterization. The characterization will include a position of the container widget in the master and a size of the container widget. In step 803, a dimension specification is accepted from the user. The master can then be viewed by the user and the user can chose to specify a second characterization to the same container widget. In step 804, an instance of the master can be added to various pages in the design. In step 805, a property of the master can be changed which will be automatically be applied to all of the various pages in the design.

Method 800 can also include steps 806 and 807. As shown in the figure, these steps can be conducted after the instance of the master is added to various pages in the design. In step 806, a widget is added to a container widget. Then in step 807, different characterizations are accepted for the widget that was added in step 806. The different characterizations can be applied to create different states for the widget that are associated with different dimension versions. Unlike the change made to a property of the master in step 805, the widget addition and characterization in steps 806 and 807 will only modify a single instance of the master. This is because the container widgets are associated with the master but the contents of the container are not. The net effect of this procedure will be that a degree of responsiveness associated with the master can be edited separately from a degree of responsiveness associated with widgets that are placed in the container widgets in the masters.

Figure 9A:
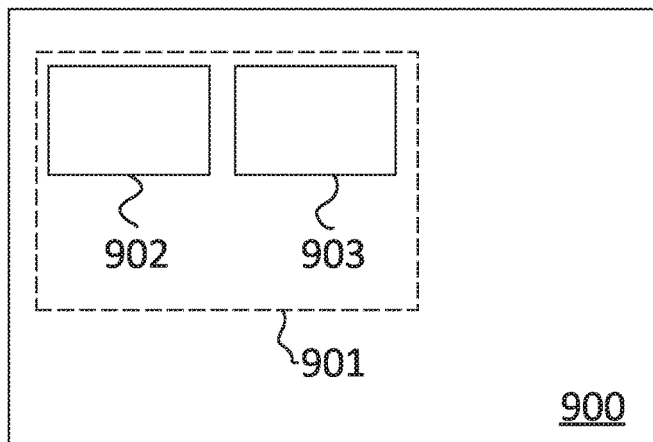
FIGS. 9a-f illustrate different versions of a responsive graphical design to illustrate certain aspects of embodiments of the present invention.
Figure 9B:
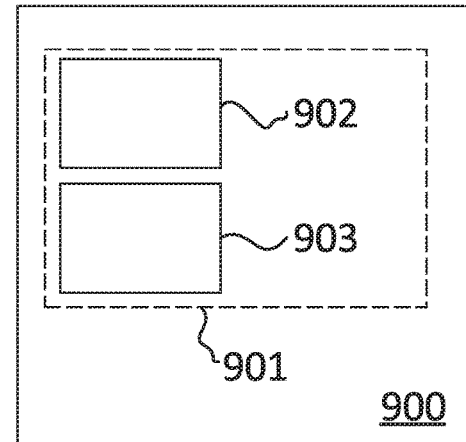
Figure 9C:
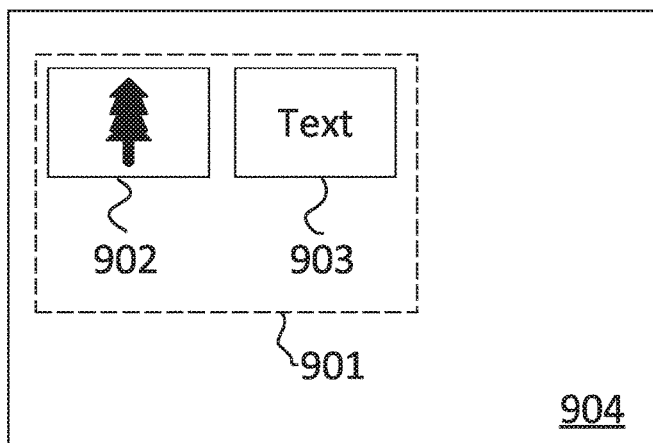
Figure 9D:
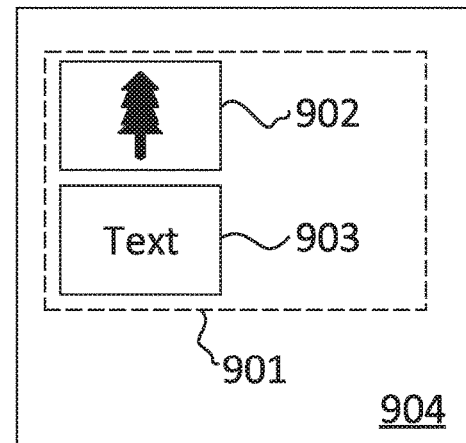
Figure 9E:
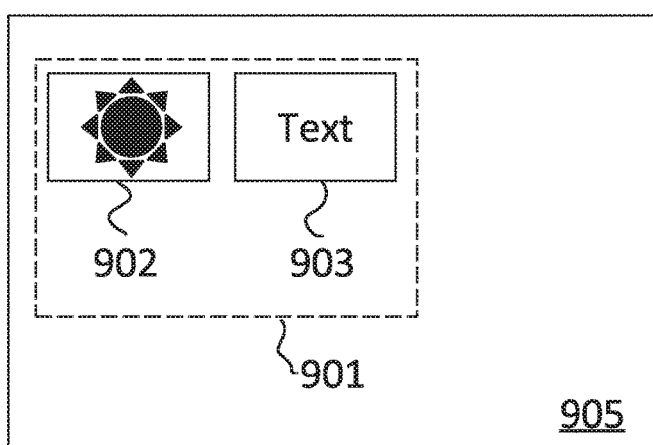
Figure 9F:
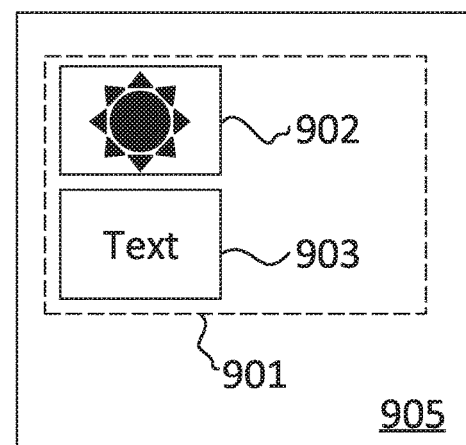

An example of the results of this method can be described with reference to FIGS. 9a-9f. FIG. 9a displays a page 900 of a design including a master 901 and two container widgets 902 and 903. The container widgets 902 and 903 are defined so that when the page is resized as shown by comparing FIG. 9a and FIG. 9b, the container widgets 902 and 903 are located in new positions in master 901. FIG. 9c displays page 904 with another instance of master 901 including additional widgets that have been added to container widgets 902 and 903. As illustrated in FIG. 9c, one of the additional widgets is a text block and one of the additional widgets is an image of a tree. FIG. 9e displays page 905, which is a different page of the same design having a still further instance of master 901. The instance of master 901 on page 905 includes additional widgets that have been added to container widgets 902 and 903. As illustrated in FIG. 9e, one of the additional widgets is a text block and one of the additional widgets is an image of a sun. Note that the responsiveness of the containers is maintained while the content of the pages is different as illustrated by comparing FIGS. 9d and 9f to FIGS. 9c and 9e respectively. Therefore, the responsiveness of the layout can be centrally managed by editing the container widgets in master 901 while the content of the individual pages can be specified independently by editing the content of the container widgets 902 and 903 on pages 904 and 905.

Using container widgets, it is therefore possible to segment aspects of a master that will be editable from a single instance of the master from aspects that will only change locally. This provides another degree of freedom to the designer to aide in maintaining design flexibility while maintaining enough interrelationships in the design to facilitate easy manipulation of the design as the design process continues.

Design Environment: Multiple Dimension Version Editing

Embodiments of the present invention that are described above facilitate the specification of a responsive design across dimension versions and various pages of a multi-page design. In particular, embodiments in which a single widget is rendered across various dimension versions allow edits made to that specific widget to propagate quickly through all dimension versions of the design because it is the same widget in each version. However, dimension versions of a responsive design are necessarily distinct which means that the states of widgets in each dimension version must be distinguishable. Therefore, embodiments of the present invention described below also enable a user to quickly specify whether a characterization will modify a widget in a limited set of dimension versions or if it will modify the widget globally across all dimension versions.

Figure 10:
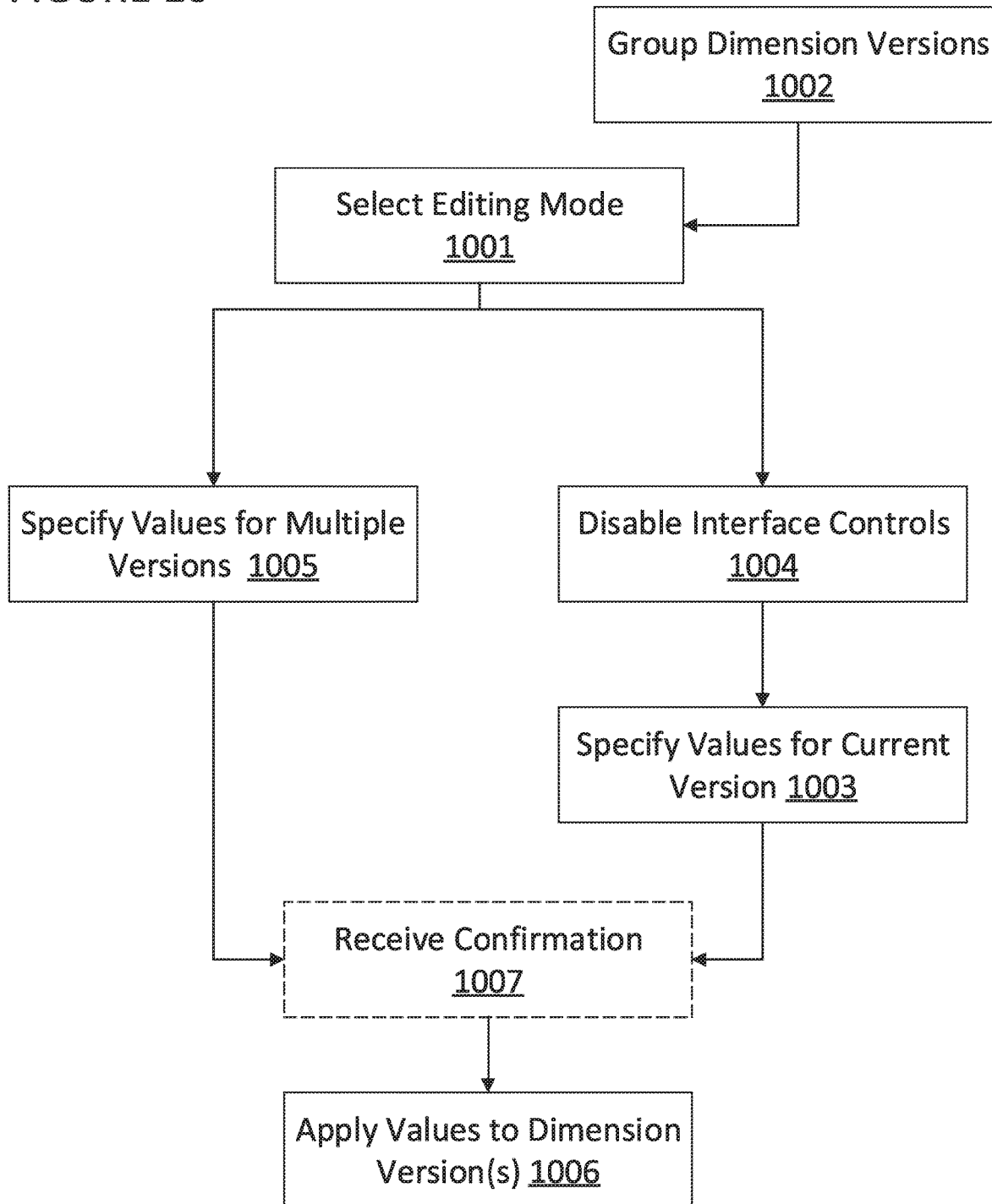
FIG. 10 illustrates a flow chart of a method for specifying a design using different editing modes that is in accordance with embodiments of the present invention.

A method 1000 of specifying a design using different editing modes can be described with reference to FIG. 10. Method 1000 begins with a step 1001 of selecting an editing mode. Method 1000 can be used in combination with any of the methods described previously. In specific embodiments of the invention, the editing modes that can be selected include a single-dimension editing mode, an all-dimension editing mode, and a multi-dimension editing mode. Step 1001 can also be preceded by step 1002 in which a subset of dimension versions are grouped to define the dimension versions that will be edited in the multi-dimension editing mode. In step 1001, a user selects one of the editing modes described previously. The method then proceeds in different branches depending upon the selection made in this step.

The user can select an editing mode in step 1002 in various ways. In specific embodiments of the invention, the default mode will be a single-dimension editing mode in which widgets will only receive specifications for the dimension version of the design that is currently being viewed or that is currently selected. In these embodiments, a user may be required to select an all-dimension or multi-dimension editing mode from a pull down menu before that editing mode will be entered. An interface for allowing the selection of an editing mode in step 1001 could be triggered automatically the first time a specification is added to a widget after a new dimension specification has been added to the design. For example, if a new dimension is added, the next time a user tries to specify a characteristic for a widget a pop up window could ask the user to specify whether or not the edit should apply globally, only to the current dimension version, or if the current dimension version should be added to a predefined sub set of dimension versions that are edited in the multi-dimension editing version.

Various measures could be provided to prevent unwanted edits being added to a design. A distinct flag could be included in the graphical design environment to inform a user what the current editing mode is to prevent the user from applying changes to other dimension versions without seeing those changes being made. For example, the text GLOBAL could appear in colored text in the gutter of the window used for the graphical design environment whenever the tool was in all-dimension editing mode. This would prevent users from mistakenly editing dimension versions they did not intend to modify. Likewise, the gallery view described previously could be employed to prevent unwanted changes by opening and closing dimension versions automatically when they are being edited. For example, the all-dimension editing mode would open a window for each of the dimension versions that were then known to the design environment. The gallery view could also be terminated automatically when the user returns to the single-dimension editing mode. Also, warning prompts could be displayed on the screen when a sub-set of characteristics are being modified in an all or multiple-dimension editing mode particularly when the characteristics being edited are those that are not usually specified differently in various dimension versions.

In a specific embodiment of the invention, the single, multiple, and all dimension editing modes are specified in a highly customizable way by a user operating on a list of dimension specifications such as those found in dimension specification interface 204. In specific embodiments of the invention, a user can select between all available single-dimension editing modes by selecting different dimension specifications in dimension specification interface 204. For example, by selecting the Default button, the user will enter a single dimension editing mode directed towards editing the default dimension version. Likewise, by selecting the Smart Phone button, the user will enter a single dimension editing mode directed towards editing the Smart Phone dimension version. In addition, the user may select additional buttons in the dimension specification interface 204 to select between various multi-dimension editing modes, and may select all of the buttons in the dimension specification interface to select an all-dimension editing mode. Multiple buttons can be selected by holding down a key such as the SHIFT key and clicking on various buttons. Furthermore, the dimension specification interface could include a list of dimension versions and a series of check boxes next to each label by which multiple versions could be selected for editing by selecting the various check boxes.

If a user selects the single-dimension editing mode, the method will continue with step 1003 in which a user is able to specify characteristics of the widget that will only apply to the widget when it is rendered in the dimension specification that the user is currently editing and/or viewing. Method 1000 includes an optional step 1004 that disables certain interface controls in this mode. For example, a name of the widget might not be capable of being changed in this mode because the name is used to recognize the widget regardless of which dimension version the widget is being viewed at or edited in. If a user selects the all-dimension or multi-dimension editing mode, the method will continue with step 1005 in which a user is able to specify characteristics of the selected widget that will apply to the widget when it is rendered in multiple dimension versions. The multiple dimension versions to in which the specification will apply depends on which editing mode the user has selected and which dimension versions are included in the multi-dimension editing mode. Regardless of the editing mode selected, the method concludes with step 1006 in which the specifications are applied to the widget for the applicable dimension versions.

The manner in which the specifications are applied to the widget in step 1006 can be implemented in various ways. As described previously, specific property values that are shared between various dimension versions can be stored once in the model of the design. This shared value could be considered a "base" value for the property. If the specification applied in step 1006 was being applied to a limited set of dimension versions, the value could be stored as an override over the base value and be linked to that limited set of dimension versions. Likewise, an all dimension specification could be applied in step 1006 by changing the base value and clearing all overrides for the property stored in the model. In embodiments in which the property values for the widget in each dimension version are stored separately, the application of the specification in step 1006 would follow a more straightforward approach of changing the property values for the dimension versions that were being edited.

Method 1000 could also include optional step 1007 as an additional measure of preventing unwanted edits from propagating through the design. In step 1007, a user is able to confirm that a specific edit or set of edits should be propagated through to multiple dimension versions. The confirmation could be provided in response to a prompt that is displayed when the user finishes a single edit, when the user closes an editing session, when the user selects a different editing mode, or when the user selects a different dimension version. In particular, the confirmation could be provided on a dimension version by dimension version basis and would require the user to confirm all pending edits that propagated through to the dimension version since the last time the graphical design environment rendered that particular dimension version for the user. The prompt could provide a summary of the edits that are being approved and could allow the user to select specific edits to approve or deny from being implemented in a particular dimension version. The graphical design environment could also display a ghost rendering of the dimension version for which approval of edits is sought so that a user could see a preview of how the dimension version would look if approval were provided.

Editing multiple dimension versions could also be aided through the use of an inheritance structure. An inheritance structure defines a relationship between multiple dimension versions by which edits in certain dimension versions are automatically propagated to other dimension versions. The most basic example of an inheritance structure would be defined using two dimension versions wherein the two versions had a parent-child relationship. Once the relationship was established, changes made to the parent dimension version would automatically propagate to the child dimension version, but changes made to the child dimension version would not propagate to the parent dimension version.

The structure could be implemented by defining an inheritance property for each dimension version in the design. The structure would therefore be comprised of an amalgamation of all the inheritance property values in the design. A two dimension inheritance structure would provide efficiency benefits to the user, and such efficiency benefits would increase as the number of dimension versions that are related by the inheritance structure increased. The inheritance structure could include multiple chains of inheritance and would not be limited to a hierarchical structure having a single hierarch. Instead, the inheritance structure could comprise a child dimension version that is related to two separate parent dimension versions such that changes made to either parent would propagate to that single child. Conversely, a parent dimension version could have multiple child dimension versions.

The changes could propagate through the inheritance structure in various ways. For example, a widget specification that altered a property of a widget in one dimension version could be stored in a memory location that would be accessed by all of that dimension version's children. As another example, the same widget specification could be copied and stored in multiple memory locations that are accessed independently by the child dimension versions. In the example where the change is copied to multiple memory locations, the change could propagate through instantaneously or it could be queued up for propagation in response to a prompt similar to the approach described with reference to step 1007 in FIG. 10. In these situations, the change to the property would be stored in one memory location to be accessed by the dimension version in which the change was made, and it would then be copied to the other memory locations in response to the receipt of a propagation command from the user.

The inheritance structure can be defined in numerous ways. For example, the inheritance structure could be automatically created as additional dimension versions are added to a design. Such an inheritance structure could follow a predetermined pattern such as one that made every smaller dimension version a child of the next largest dimension version and vice versa. Generally, the original dimension version in a design before any other dimension versions have been created or edited would serve as the base or default dimension version for the inheritance structure and it would serve as the parent for all additional dimension versions added to the design. The inheritance structure could also be left undefined until a user affirmatively formed the structure. In situations where multiple dimension versions are provided to the user as soon as a new design is opened, the user could select a dimension version to serve as the base version for the design. The user could also be provided with the ability to create any desired inheritance structure between the various dimension versions in the design and continually configure the inheritance structure while working on the design. Depending upon how the inheritance structure is defined, it could allow a user to utilize a global editing mode by relating all dimension versions back to a single hierarch in the structure. This hierarch would not be limited to the largest or smallest dimension version in the design because, as mentioned previously, the user could define any relationship desired such that the base dimension version could be an average size dimension version and both larger and smaller dimension versions would inherit edits made to the mid-sized dimension version. Likewise, the inheritance structure could allow a user to utilize a sub-group editing mode by editing the parent of one chain of child dimension versions in a hierarchy comprising multiple chains.

A computer-implemented method 1100 for allowing a user to specify a responsive web page design using an inheritance specification that is in accordance with specific embodiments described above is illustrated in FIG. 11. Method 1100 begins with step 1101 in which a rendering of a first dimension of a web page is generated for a user. The rendering could be displayed in a window such as window 201 in FIG. 2. The rendering can include an interactive widget. Method 1100 continues with step 1102 in which an inheritance specification is received from the user. The inheritance specification defines an inheritance structure of the design. For example, the inheritance structure defined by the inheritance specification could define a second dimension version as a child of the first dimension version. The defined inheritance structure could be an initial inheritance structure specified for the design or it could override a default inheritance structure that was in place before any input was received from the user to affirmatively define an inheritance structure. Method 1100 continues with step 1103 in which a widget property specification is received from the user while the user is editing the first dimension version. In step 1103, the widget property specification could be received while the user is editing the first dimension version by entering a value for a first property of the interactive widget in window 201 in FIG. 2 or widget interface 202. Method 1100 continues with step 1104 in which the specification for the first property is stored for both the first and second dimension versions while the user is editing the first dimension version. Step 1104 could be conducted automatically as described above such that the first property would be modified simultaneously in the second dimension version while the user is editing the first dimension version. This simultaneous modification could be carried out using a data structure in which the same location in memory was accessed for the property of the widget in both the first and second dimension versions.

Figure 12:
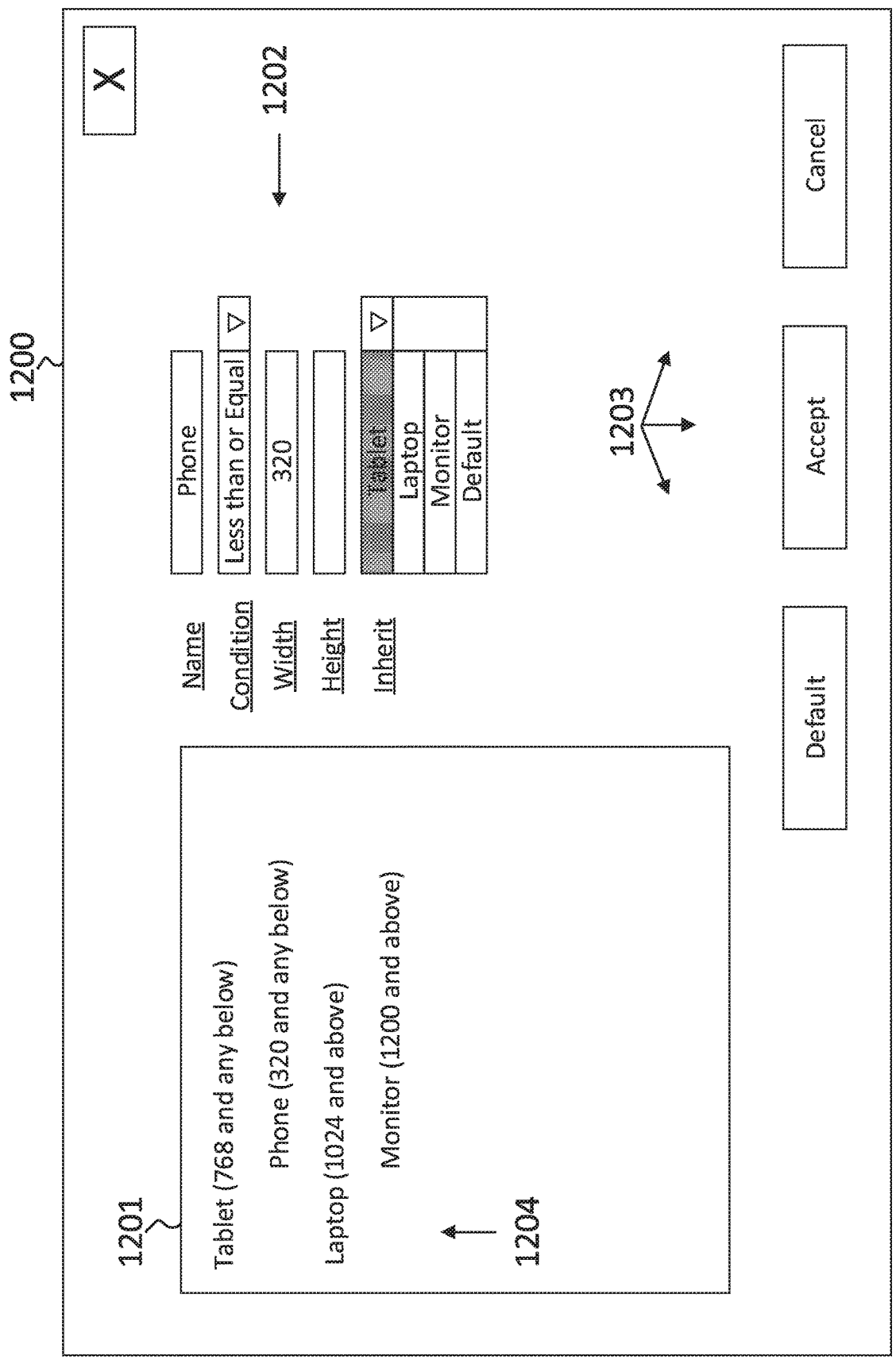
FIG. 12 illustrates a graphical user interface for specifying dimension versions and an inheritance structure for an interactive graphical design that is in accordance with embodiments of the present invention.

Graphical user interfaces that would allow a user to specify an inheritance structure can be described with reference to inheritance specification interface 1200 in FIG. 12. As discussed above with reference to FIG. 2, the dimension specifications in dimension specification interface 204 can be entered by a user. Aside from providing an interface for inputting an inheritance structure, inheritance specification interface 1200 also provides an example of how those dimension specifications can be entered. Inheritance specification interface 1200 could be accessed through a toolbar or other link from graphical design environment 200. Inheritance specification interface 1200 allows a user to define an inheritance structure while dimension specifications are entered and dimension versions are created. Once the dimension versions are created, a user could also return to inheritance specification interface 1200 to modify the inheritance structure of the design as desired.

Inheritance specification interface 1200 comprises inheritance specification display window 1201, inheritance specification input interface 1202, and top level specification buttons 1203. The specification buttons allow a user to accept a specified inheritance structure, cancel the specifications made in the current session, or revert the inheritance structure to a default configuration. Display window 1201 graphically displays a description of the current inheritance structure to the user. Input interface 1202 allows a user to input specifications for the inheritance structure.

Display window 1201 could display the current inheritance structure in numerous different ways. For example, the structure could be shown as a hierarchical web of connections or a list grouped by inheritance branches. As illustrated, display window 1201 illustrates the inheritance structure using a list grouped by inheritance branches with indentations to indicate child-parent relationships. Indentations 1204 provide a graphical representation of the parent-child relationships that comprise the current inheritance structure. In the specific illustration of FIG. 12, the Phone dimension version is a child of the Tablet dimension version; and the Monitor dimension version is a child of the Laptop dimension version. Display window 1201 could also display the relationship of the dimension versions to their dimension specifications. In the specific illustration of FIG. 12, for example, the Phone dimension version is rendered in a player when a rendering space for the design is less than a width of 320 pixels.

Input interface 1202 allows a user to specify a new dimension version or edit a current dimension version. In the specific illustration of FIG. 12, a user is editing the Phone dimension version. The particular dimension version to be edited in input interface 1202 could be identified by selecting the name of the dimension version in display window 1201 or by entering the name of the dimension version in input interface 1202. When a new dimension version is added, a user will need to input the associated dimension specification by entering dimensions and a user may also need to enter a condition associating the dimension specification with the dimension version. As illustrated, the Phone dimension version is specified to be rendered whenever the rendering space afforded the design is less than or equal to 320 pixels. The units for the dimension entry could also be in physical distance units. The Condition property is shown as being specified in a pull down menu, but the content of that menu is not shown. In keeping with embodiments described above, the condition could be: less than, greater than, less than or equal to, greater than or equal to, or equal to. The condition chosen will determine whether the dimension specification serves as a trigger point or a target dimension. The illustration also shows the pull down window for the Inherit property of the Phone dimension version. As illustrated, a user can select any of the defined dimension versions to set as the dimension version from which the Phone dimension version will inherit modifications. When other dimension versions are added to the design, the Inherit pull down menu could reflect the presence of the additional versions. The conditions and dimension versions identified in the input interface could also be specified without the use of pull down menus. A user could textually enter the symbol ">" to specify the condition for inheritance, or the word "Tablet" to specify the dimension version in inheritance specification interface 1200.

Referring back to FIG. 11, step 1102 could be conducted using inheritance structure interface 1200. In accordance with such an approach, step 1102 could comprise generating inheritance specification interface 1200, inheritance specification display window 1201, and inheritance specification input interface 1202; and allowing a user to confirm a specified inheritance structure by selecting the Accept button from among buttons 1203. This step could be repeated numerous times as additional dimension versions were added to a design.

Figure 13:
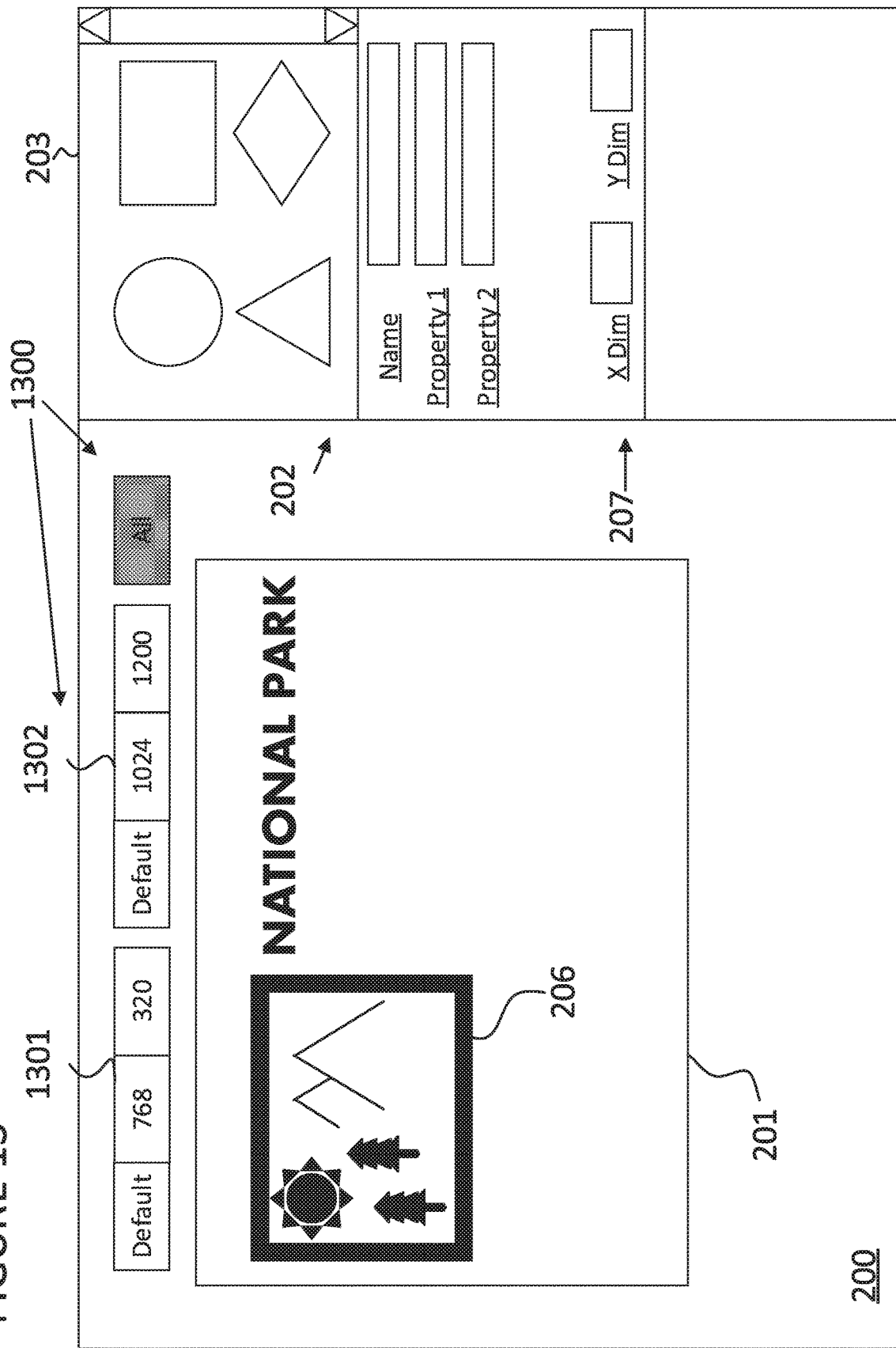
FIG. 13 illustrates a graphical user interface for a graphic design tool with a dimension version and inheritance structure toolbar that is in accordance with embodiments of the present invention.

The inheritance structure could also be displayed to the user in the form of a tool bar in graphical design environment 200. In this situation, method 1100 would also include the step of generating an inheritance specification tool bar to be displayed with the rendering. Examples of this kind of tool bar can be displayed with reference to FIG. 13 which illustrates toolbar 1300 above window 201. Toolbar 1300 allows users to select between different editing modes by selecting the buttons labeled with different dimension specifications. For example, if a user selected button "1200" the dimension version associated with dimension specification 1200 would be displayed in window 201 and the user could edit that dimension version. The user could also select the "All" button to enter a global editing mode in which an edit made to the current dimension version would propagate to all of the other dimension versions in the design. As mentioned previously, the user could also potentially select a sub-set of the dimension versions by, perhaps, selecting multiple buttons while pressing the "SHIFT" key, at which point they would be editing all of the selected version of the design, but not the other dimension versions. The toolbar can also display the inheritance structure of the design as the different dimension specifications can be arranged to symbolize the inheritance structure. For example, toolbar 1300 as illustrated is arranged into groups 1301 and 1302 that each display separate inheritance structure branches running from left to right. This graphical arrangement describes the inheritance structure of the design as an edit made to Default will be inherited by all of the other dimension versions, an edit made to 768 will be inherited by 320 but not 1200, and an edit made to 1200 or 320 will not be inherited by any dimension versions. Toolbar 1300 therefore gives the user a convenient way to skip between dimension versions as well as a convenient way to keep track of how the dimension structure is currently specified.

Method 1100 can be modified such that a user can specify certain properties of a widget that are not modified through inheritance. The division of properties into categories that propagate in different ways can be referred to as specifying the inheritance characterization of a design. The inheritance characterization of a design may be set by default. For example, the location, size and style of a widget could be affected by inheritance while the interactivity of a widget and the text content are not. As another example, a change made to the text style of a widget might change according to the inheritance structure of the design, but a change made to the text content of a widget in any dimension version might propagate through to the widget as it appears in all other dimension versions regardless of the inheritance structure. As another example, the existence property of a widget might not propagate automatically through inheritance, but the absolute position of the widget in the design could propagate automatically. The manner in which different properties propagate through inheritance might also differ from one widget property to another. For example, a color of a widget might propagate automatically while a size of a widget might be inherited and require a confirmatory response from a user before the change propagated to another widget. The inheritance characteristic of a design might also be configurable by a user on a categorical property by property basis. For example, a user might be able to set a text content property as a property that is automatically propagated through inheritance while a color property is not. A user may also configure the inheritance characteristic on a widget by widget basis such that the manner in which changes made to a particular widget propagated by inheritance could be configured by the user.

The inheritance characterization can be specified in numerous ways. For example, a user may be given a list of properties for a particular widget or a particular design with a set of checkboxes that the user can mark to determine if that property will propagate through inheritance or not. Some of the check boxes may be greyed out because the design environment might prevent certain properties from being inherited. As another example, a user may indirectly specify an inheritance characterization by editing a property in a child dimension version. In these embodiments, edits made to a child dimension version serve to remove that property of that particular widget from being modified later on through inheritance. The set of properties to which this manner of specifying an inheritance characterization applies could be limited. For example, the color of a widget could be characterized as a property that should not be inherited after a change to a child dimension version has been made while the absolute position of a widget can still be modified through inheritance. The edits made to a child dimension version in these embodiments can be referred to as an override widget property specification, because it overrides any later attempts to change the property via inheritance.

Figure 14:
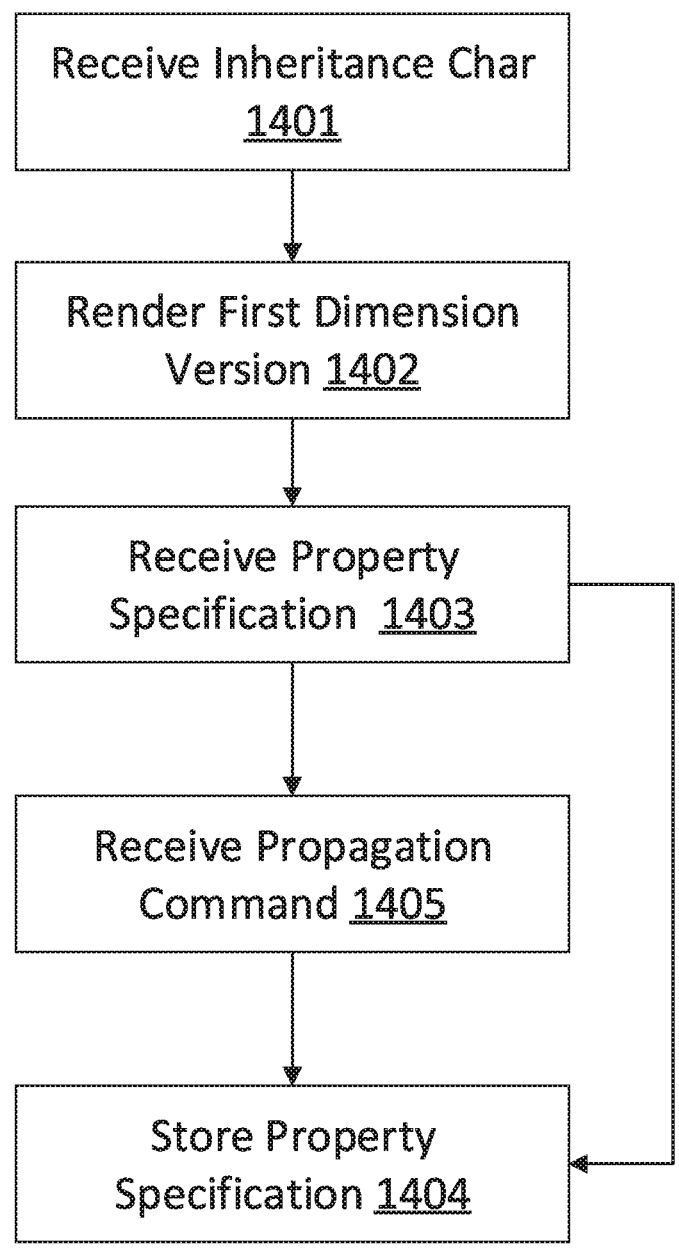
FIG. 14 illustrates a flow chart of a method for specifying and applying an inheritance structure and inheritance characterization to an interactive graphical design that is in accordance with embodiments of the present invention.

A computer-implemented method 1400 for allowing a user to specify an inheritance characteristic for an interactive graphical design can be described with reference to FIG. 14.

In step 1401, an inheritance characterization specification is received from a user. The inheritance characterization characterizes certain properties into properties that are affected by inheritance and those that are not affected by inheritance. As stated previously, the specification can be received via a user interface that is specifically designed to receive the characterization from the user or the specification can be received indirectly through the receipt of an override property specification with a user affirmatively specifying a property or set of properties in a child dimension version. The user interface used in the first approach could be referred to as an inheritance characterization specification interface. The second approach to characterizing the subset of properties is not separately illustrated in FIG. 14 since it should be considered a different approach to step 1401 and not an additional or alternative step. In step 1402, a first dimension version of the interactive graphical design is rendered. The first dimension version has a parent-child relationship with a second dimension version according to an inheritance structure of the design. In step 1403, a widget property specification is received from the user while the user is editing the first dimension version. In step 1404, the widget property specification that was received in step 1403 is stored for the first dimension version and second dimension version in accordance with the inheritance structure and inheritance characterization. If the inheritance characterization characterized all of the widget properties that were altered in step 1403 as properties that were exempt from inheritance, then no changes would propagate to the second dimension version in step 1404. However, if any of the widget properties that were altered in step 1403 were not exempt from propagating, then those changes would be applied to the widget in the second dimension version in step 1404.

Method 1400 can also include alternative step 1405. Step 1404 can be conducted by storing the property specification received in step 1403 at a single address in memory that is accessed by multiple dimension versions. However, the property can also be copied to multiple locations in memory to be accessed by multiple dimension versions. In this situation, method 1400 could include alternative step 1405 in which a propagation command is received from the user to copy the value for the property specification into alternative locations for each of the multiple dimension versions. This command can be received directly via any of the prompts described above or indirectly through an alternative action that is used to indicate changes should be propagated through the inheritance structure such as opening a different dimension version.

Management of the existence property is particularly important for situations where a design is being edited across multiple dimension versions. As mentioned in the first section above, a separate interface besides the design rendering window will sometimes be needed to manage this property because there will not be a visual representation of the widget in the design from which to initiate edits to the widget's properties. Furthermore, having the deletion of a widget propagate through a design automatically can be problematic because a designer might not notice that something is amiss when switching to a different dimension version because there will not be a visual cue to indicate that the edit was erroneously removed such as when a color change to a widget or text size property is readily apparent when the user switches to a different dimension version. In addition, the presence of multiple widgets in a large dimension version can leave a design unacceptably cluttered when a user first switches to a much smaller dimension version unless some kind of cross-version management system is applied to the existence property. For example, a desktop dimension version may include 30 equally spaced widgets that would flood the screen of a mobile phone dimension version and make selecting individual widgets difficult when switching to the smaller dimension version.

The existence property can be utilized to facilitate the specification of designs having multiple dimension versions. The existence property can be treated by the inheritance structure of the design in the same way as other properties discussed above. However, certain benefits accrue to approaches in which the existence property is treated differently than other properties for purposes of inheritance. For example, placing a widget in a dimension version can result in all of the children of the dimension version receiving the placed characterization for that widget while all of the parents of the dimension version receive an unplaced characterization for the widget. In such embodiments, the existence property is treated slightly differently for purposes of the inheritance characterization because making a modification to a widget property in a child dimension version has an effect on the widget property in the parent dimension version. As another example, when a widget is added to a parent dimension version—and the existence property for the widget for that dimension version is set to a placed value—the existence property for the widget in a child dimension version can remain unplaced. In other words, the existence property will be characterized as one that is not affected by inheritance in the inheritance characterization. A designer will instead have to affirmatively alter the property in all dimension versions to which the widget needs to be added. The benefit of this approach would be that placing a large number of widgets in a large dimension version would not automatically over clutter a smaller dimension version. The same approach could be applied to a change in the widget's existence property from a placed state to an unplaced state in that the change would not propagate in accordance with the inheritance structure and the widget would need to be removed in all dimension versions manually.

Deleting a widget in one dimension version could be treated as an alteration of the widget's existence property rather than a removal of the widget from the entire design. In these situations, the alteration of the widget's existence property could be treated in accordance with the standard rules in the design for how changes propagate according to the inheritance structure for the design. In other words, the widget would transfer from a placed state to an unplaced state in the dimension version that was being edited, and all of its children, but the deletion would not alter the existence state of the widget in its parents.

Figure 15:
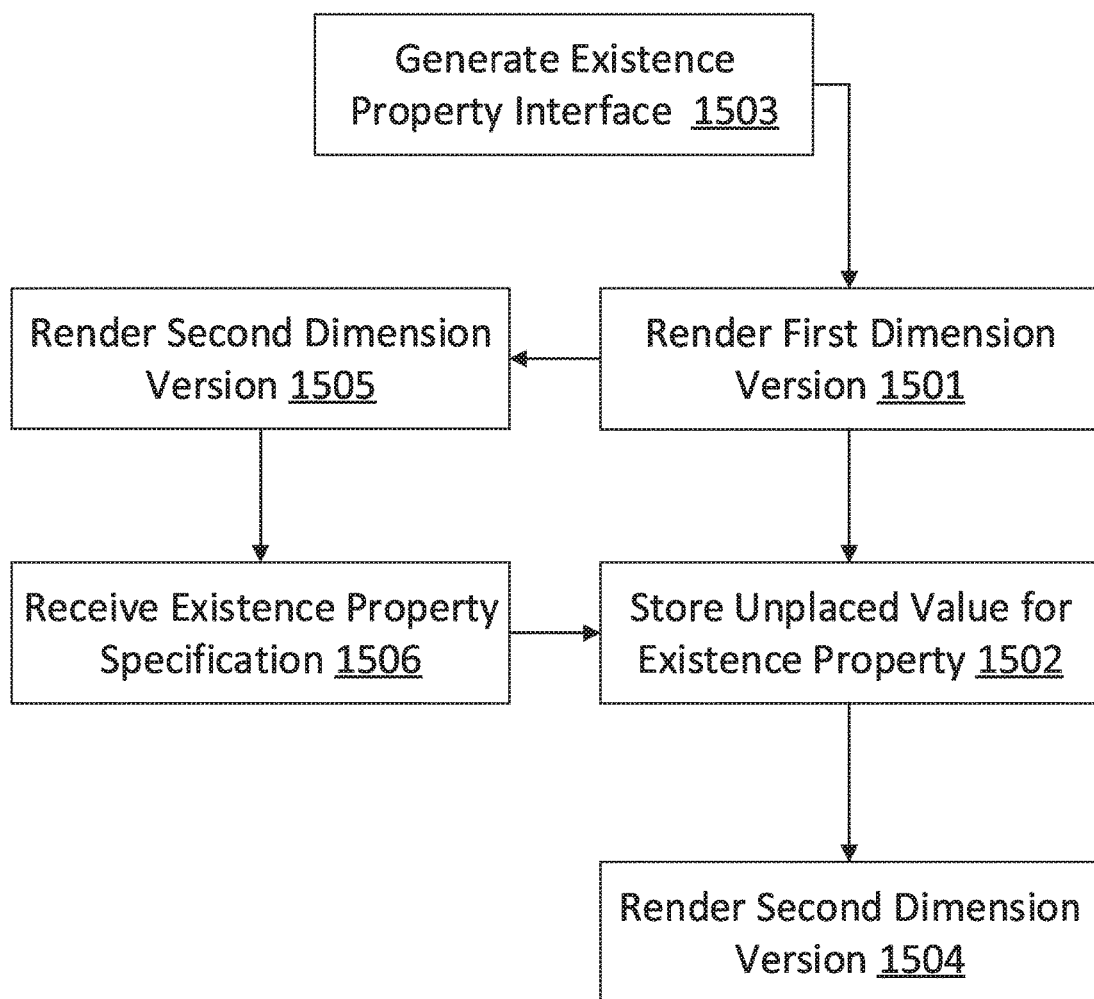
FIG. 15 illustrates a flow chart of a method for specifying an interactive graphical design with widgets having an existence property that is in accordance with embodiments of the present invention.

A method 1500 for allowing a user to specify an interactive graphical design and manage an existence property across multiple dimension versions can be described with reference to FIG. 15. Method 1500 begins with step 1501 in which a first dimension version of a graphical design is rendered. The widget has an existence property and the property has a placed value. The method also includes step 1502 in which an unplaced value for the existence property of the same widget in a second dimension version is stored in memory. Step 1502 and 1501 are displayed in sequence, but step 1502 can be conducted prior to step 1501 and persist through the occurrence of step 1501. Method 1500 also includes step 1503 in which an existence property interface is generated and step 1504 in which a rendering of a second dimension version of the design is generated. The widget does not appear in the second dimension version in step 1504 because the existence property of the widget has an unplaced value in the second dimension version.

In situations where the existence property propagates automatically with the inheritance structure, method 1500 could include step 1505 in which a second dimension version of the design is rendered. In this situation, the widget that was placed and rendered in the first dimension version in step 1501 would also be in a placed state and be rendered in the second dimension version in step 1505. Method 1500 could then continue with step 1506 in which an existence property specification was received from the user to change the existence property of the widget to an unplaced state. Step 1506 could involve receiving a specification from the user deleting the widget while the user was editing the first dimension version. The method would then continue with step 1502 in which the unplaced state for the widget in the second dimension version was saved in memory. In this situation, the saving would be conducted in response to the receipt of the existence property specification in step 1506. In keeping with how other properties are affected by the inheritance structure, if the same widget was deleted, or the existence property of the widget were otherwise changed to an unplaced state, in the second dimension version; then the value for the existence property of the widget in the first dimension version would remain unaltered.

Figure 16:
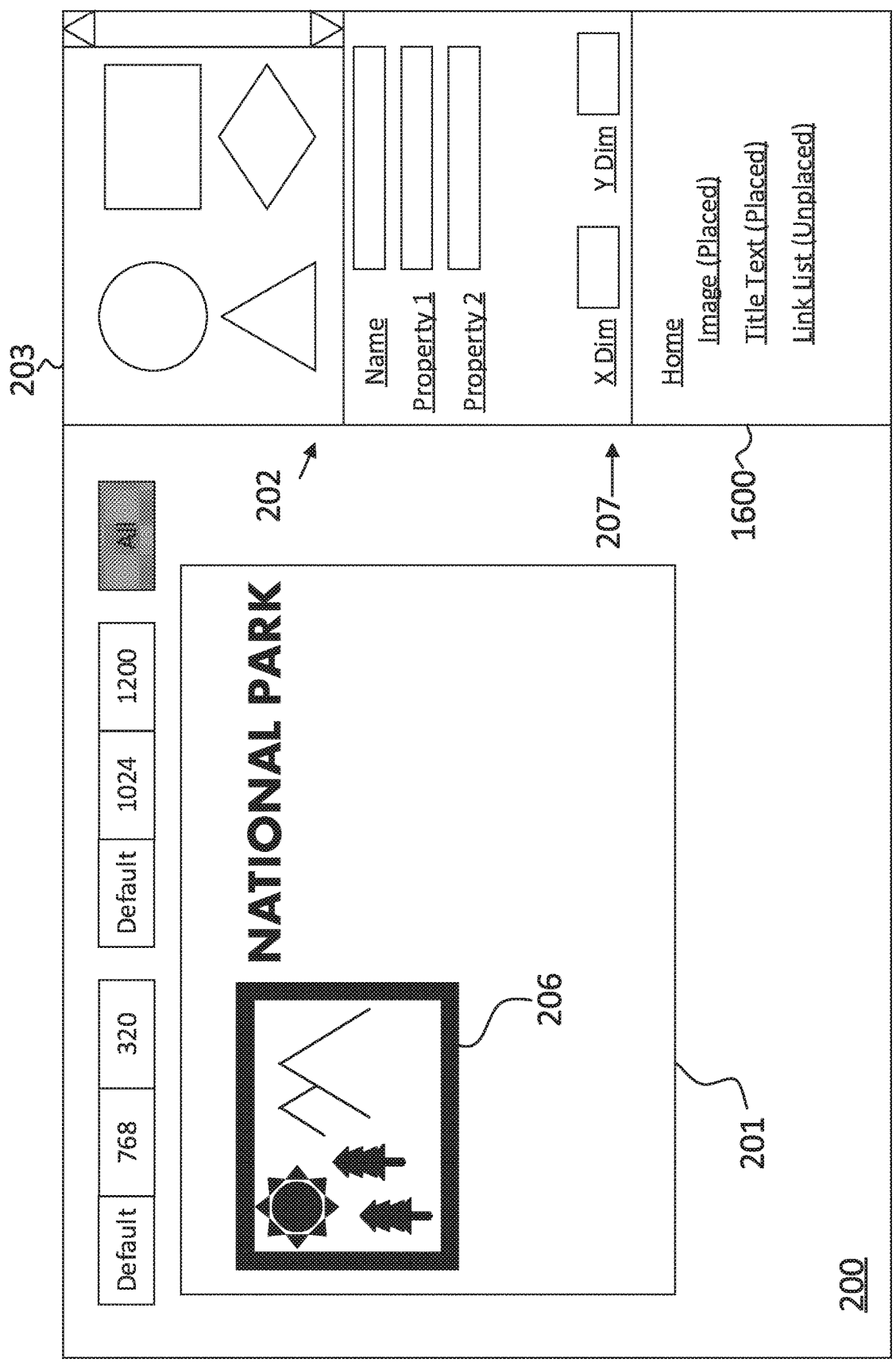
FIG. 16 illustrates a graphical user interface for a graphic design tool with an existence property interface that is in accordance with embodiments of the present invention.

An example of the existence property interface is illustrated as existence property interface 1600 in FIG. 16. As mentioned previously, the existence property may generally require a separate interface due to its particular characteristics. As illustrated, existence property interface 1600 provides a list of all of the widgets in the design and an indicator for their existence property value in the currently displayed dimension version. In embodiments in which window 201 was replaced with a gallery view, a single existence property interface 1600 could still be employed as long as it reflected the state of the dimension version in the gallery that was currently being edited. As shown, the title and hero image 206 have a placed value for their existence property while the link list 104 has an unplaced value. Existence property interface 1600 may allow users to toggle the placed or unplaced value for the existence property on a per widget basis by allowing users to click on the name of the widget in the existence property interface 1600. In the illustrated example, a user could click on the text "Link List" and link list 104 would be placed, and appear in window 201. At the same time, the status of the existence property for the link list widget would change from Unplaced to Placed in existence property interface 1600. The existence property interface could also reflect the real time status of widgets in the design, and be populated with additional widgets whenever an add command was utilized by a user to add a widget to the design. Likewise, the interface could reflect an unplaced value for widgets in real time as they are the subject of a delete command from the user. In general, the existence property interface 1600 will indicate that a widget is placed in a dimension version if the widget is displayed simultaneously with the dimension version and will indicate that a widget is unplaced in a dimension version if the widget is not displayed simultaneously with the dimension version. The hidden property could also be used to provide this functionality and be managed through a similar interface. However, it is often desired to have hidden widgets rendered in ghost or outline form in the design environment so the benefits of reducing clutter would not be provided as cleanly by that approach.

The existence property interface can take on various configurations as long as it provides a way to manage widgets that are not placed in a dimension version of the design. Existence property interface 1600 could also display the existence property for widgets in dimension versions that are not currently being rendered in the design environment. For example, the existence property interface could provide a matrix of widgets and the existence property for each of those widgets across all of the dimension versions in the design. The Existence property interface 1600 could also be limited to displaying widgets that were not currently placed in whatever dimension version was being rendered. This could be beneficial because the list of widgets in the interface would be limited, and because placed widgets can be edited directly and unplaced by selecting the widget and issuing a delete command.

Design Environment: Resize Events

As described above, a user is able to specify a design that responds to adjustments to a rendering space afforded the design by altering the state in which a widget is rendered. In similar fashion and using the same design environment, a user may also be able to specify a design that responds to adjustments to the rendering space afforded the design by executing actions when the rendering space is adjusted. The resulting functionality could be displayed in window 201 or it could be imparted to the design only once it has been exported from the design environment. These actions could be added for specific transitions such as a transition to a particular dimension version or a transition between a particular set of dimension versions.

The design could be specified such that actions were executed when a rendering space afforded the design was resized. An event handler could be added to the design and made conditional on the width of the rendering space being equal to, less than, or more than, a dimension specification. The event handler does not need to be associated with a widget as it could instead be associated with the design in other ways. The event handler could utilize an OnResize event to execute the desired action when a rendering space was adjusted. The event handler in this case can be described as "listening" for the OnResize event. Upon the occurrence of the OnResize event, the event handler would compare the current size of the rendering space to one or more preset dimension specifications and then selectively execute its associated action. For example, a page could have a "show display panel" event handler, and the panel could be displayed when a width of a player used to render the design was set to a certain size.

The design could also be specified such that actions were executed when a specific dimension version was selected for rendering, regardless of the rendering space afforded for that version. For example, a viewer of the design may be able to display a Smart Phone dimension version of a design without changing the size of a player that was previously being used to render a Desktop dimension version of the design. This functionality could be afforded in various ways. For example, a "fake" event could be added to the design that fires whenever the dimension version being rendered changes. The event is "fake" because a browser used to render the design will not have an equivalent event. This fake event could be "heard" by the associated event handler and be used by the event handler to execute its action just as if the rendering space had been resized and the OnResize event had dutifully fired. As another example, the input used to select the new dimension version could be set to trigger the action directly. This approach would not require the firing of an event to be detected by the design code.

Exported Design: Responsive Encoding and Presentation

Designs specified in a design environment using the tools and methods described above can be used to generate an instantiation of the design for rendering in an external player. In specific embodiments of the invention, the design will be exported from the tool in the form of an instantiation that can be stored and rendered externally to the tool at any time. The exported design could be a prototype of a web page or web site and the external player could be a web browser. In such cases, the instantiation of the exported design could be encoded entirely in style sheet and markup language even though the in-tool renderings of the design might not utilize any markup language. The degree to which the responsive nature of the design is expressed in the generated instantiation of the design may be configurable by a user. Likewise, the nature of the instantiation in terms of how it enables its responsive nature may be configurable by a user. The responsiveness of the designs is determined by the processes uses to specify the design. The states to which the widgets are modified in each dimension version are predefined states that depend solely on the display dimensions of the rendering space of the external player. Tools and methods for defining the nature of exporting and the nature of the exported instantiation of a design can be described with reference to FIGS. 11-13.

In specific embodiments of the invention, the generated instantiation of the design can have varying degrees of the design's responsive nature expressed. For example, a user may choose to export an instantiation of the design that is not responsive. The user could select a particular dimension version and generate an instantiation based strictly on that dimension version. As another example, a user could generate an instantiation of the design that is not responsive to any dimension of the rendering space afforded by the external player, but that still contained all of the dimension versions associated with the design. This instantiation could be exported with an encoding of a selector box that would allow a viewer of the rendered instantiation to select between the different dimension versions. The selector box could be displayed on each page of the design across all dimension versions and could include a set of buttons that could be pressed to switch the rendered design between one dimension version and another. Finally, a user could of course generate an instantiation of the design that was fully responsive to a dimension of the rendering space afforded by the external player as was specified in the design environment.

Figure 11:
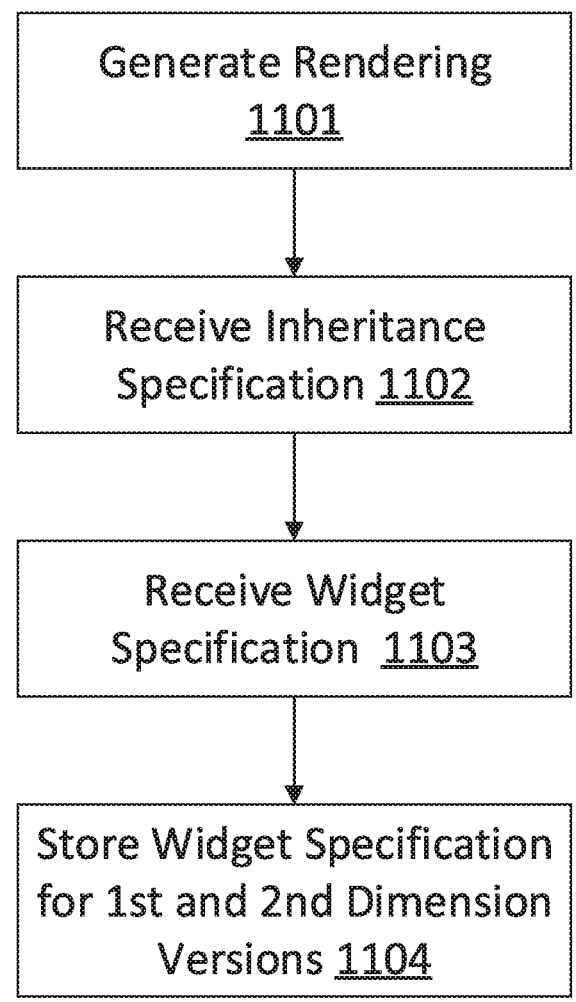
FIG. 11 illustrates a flow chart of a method for specifying and applying an inheritance structure to an interactive graphical design that is in accordance with embodiments of the present invention.
Figure 17:
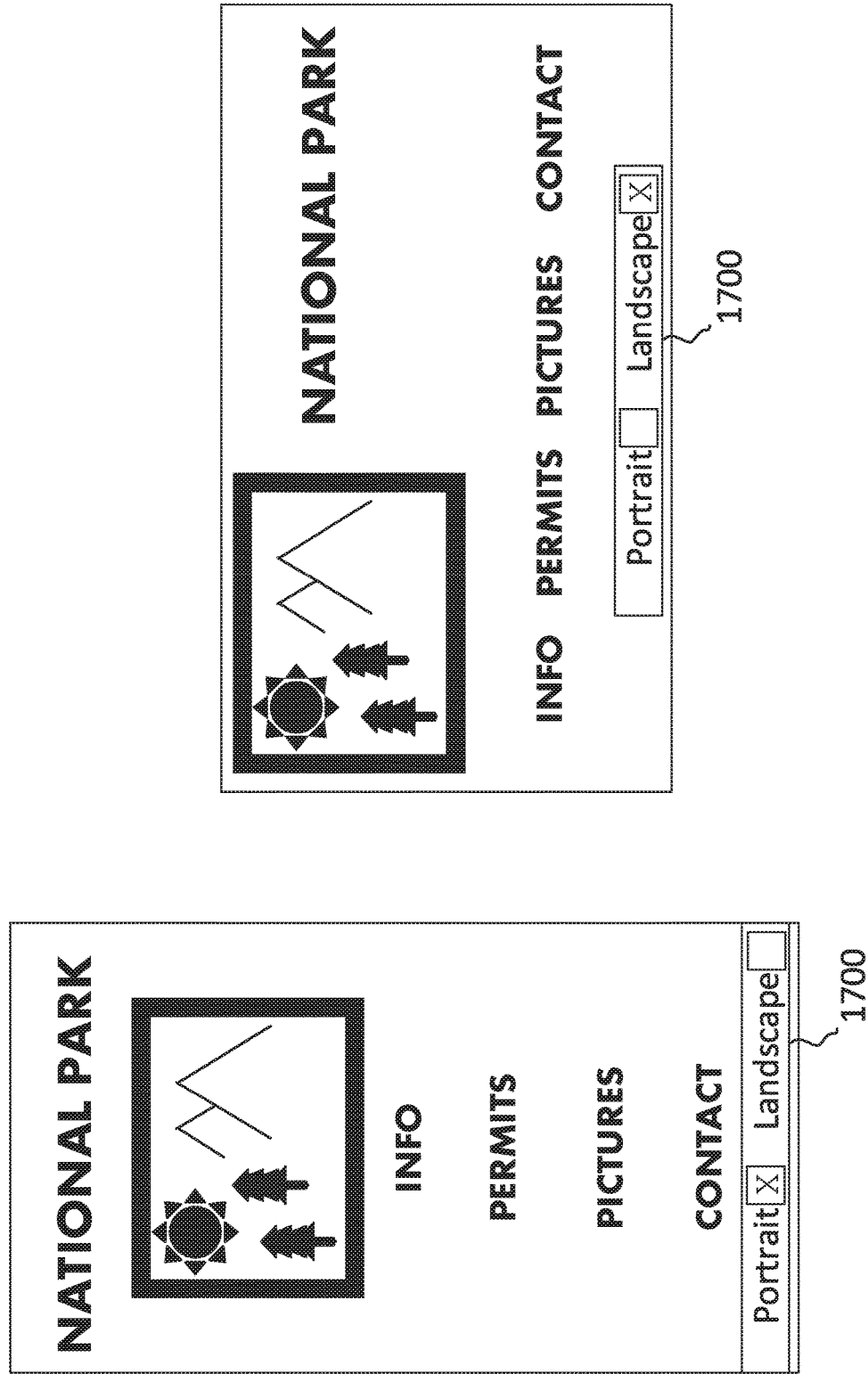
FIG. 17 illustrate different portions of an exported instantiation of a responsive graphical design having a dimension version selector that is in accordance with embodiments of the present invention

A selector box such as the one described in the previous paragraph can be better understood with reference to FIG. 11. FIG. 17, displays the dimension versions of a single page in a design that were illustrated in FIG. 2 with the addition of selector box 1700. A viewer of the exported design could click on a check box to indicate which of the dimension versions of the design the viewer wanted to view. After switching to the dimension version, the viewer would be able to navigate through the design and view the various pages at the same dimension version and could switch to a different dimension version at any time by making a different selection in selector box 1700.

In specific embodiments of the invention, the generated instantiation can enable its responsiveness in various ways. For example, the generated instantiation could comprise media queries in an encoding of the instantiation, the generated instantiation could include an object model event used to trigger a script, or it could include entire instantiations of each dimension version of the design linked together using a selector such as selector 1700. Each of these options is described in more detail below.

Media queries are markup language definitions that a browser understands and uses to automatically apply style sheets to a design. As such, they provide a way to enable responsiveness in a design. The variables of a media query could be set to a dimension specification of the design, and the style sheet associated with the media query could be defined to set a characteristic for a particular widget as required by a dimension version associated with that dimension specification. For example, a widget may be a text box that was specified to use 12 point font in a default state and 10 point font when a rendering space width for the design was less than 10 inches. The media query feature utilized in this example would be the "width" feature and the condition would be "less than 10 inches." The associated style sheet for the particular media query would set the font used in the text box to 10 point font. Media queries are intrinsic to browsers so they are very efficient. However, they are limited to providing responsiveness only to characteristics of a widget that can be modified by a style sheet. A different approach should be used for deeper responsive design.

Object model event handlers listen to various programming objects to monitor their characteristics and execute an event when those characteristics meet certain conditions. In specific embodiments, these object model event handlers can be used to provide a responsiveness characteristic to exported instantiations of a responsive design. For example, the object monitored by the object model could be a page used to render the design. The event could be an on Resize event such that every time the page was resized, the event would execute and determine a current dimension of the rendering space used for the design. Based on a comparison of this dimension to the dimension specifications, which would also be encoded in the design, the encoded instantiation could run a script to modify the design. The script would alter the design being provided to the external player such that a different dimension version would be rendered by the player. The script could be a javascript. Since the modifications to the design provided by object models are only limited by what can be encoded in a javascript, the designs can exhibit deep degrees of responsiveness including the ability to have interactive properties of the widgets in the design change based on the current rendering space afforded to the design.

The responsiveness of exported designs that include a selector could be enabled in various ways. For example, the responsiveness could be enabled by exporting each dimension version of the design as a separate instantiation with the addition of links between each set of corresponding pages in the dimension versions. In these embodiments, this added functionality would only require the different dimension versions to be modified to include markup language defining the selector on each page. When selected, the selector could serve to link a user from one page of a dimension version to another corresponding page of a different dimension version. The viewer would then be able to navigate through one dimension version for as long as desired before transferring back to the prior dimension version using the link provided in the selector. As another example, the responsiveness of the design could be enabled through the use of frames. The instantiation could be exported such that, when rendered, a frame was provided in the rendering space that contained the selector. That frame would not change throughout the rendering of the design, but would instead remain static while different pages of the design were rendered by the browser in another frame in the rendering space.

Instantiations of responsive designs that are in accordance with the previous paragraph would allow someone to demonstrate the responsiveness of the design without having to actually resize the player. In specific situations, this approach would provide an advantage for people that are attempting to review a prototype of a web page because it can be helpful to analyze each dimension version with the same degree of scrutiny while still being assured that each dimension version of the design has been completely specified.

A user can choose to export an instantiation of a design from the design environment using an export interface. The export interface will provide a connection between the user and an export module that is used to generate the exported instantiation of the design. The export interface can be accessible from the graphical design interface discussed above with reference to FIG. 2. The export interface could be a permanent button displayed on the graphical design interface, a selectable option in a pull down menu, or it could be a more complex window displaying various selectable options to specify the nature of the export. The complex export interface could allow the user to specify what degree of responsiveness the instantiation will exhibit as described above. Likewise, the export interface could allow the user to specify how the responsiveness of the design will be enabled. For this option, certain options may be prohibited based on what characteristics of the design's widgets have been made responsive. For example, in a design in which the interactive properties of a widget have been made responsive, the option to export an instantiation where media queries provide the responsiveness of the design may be prohibited in the export interface.

Figure 18:
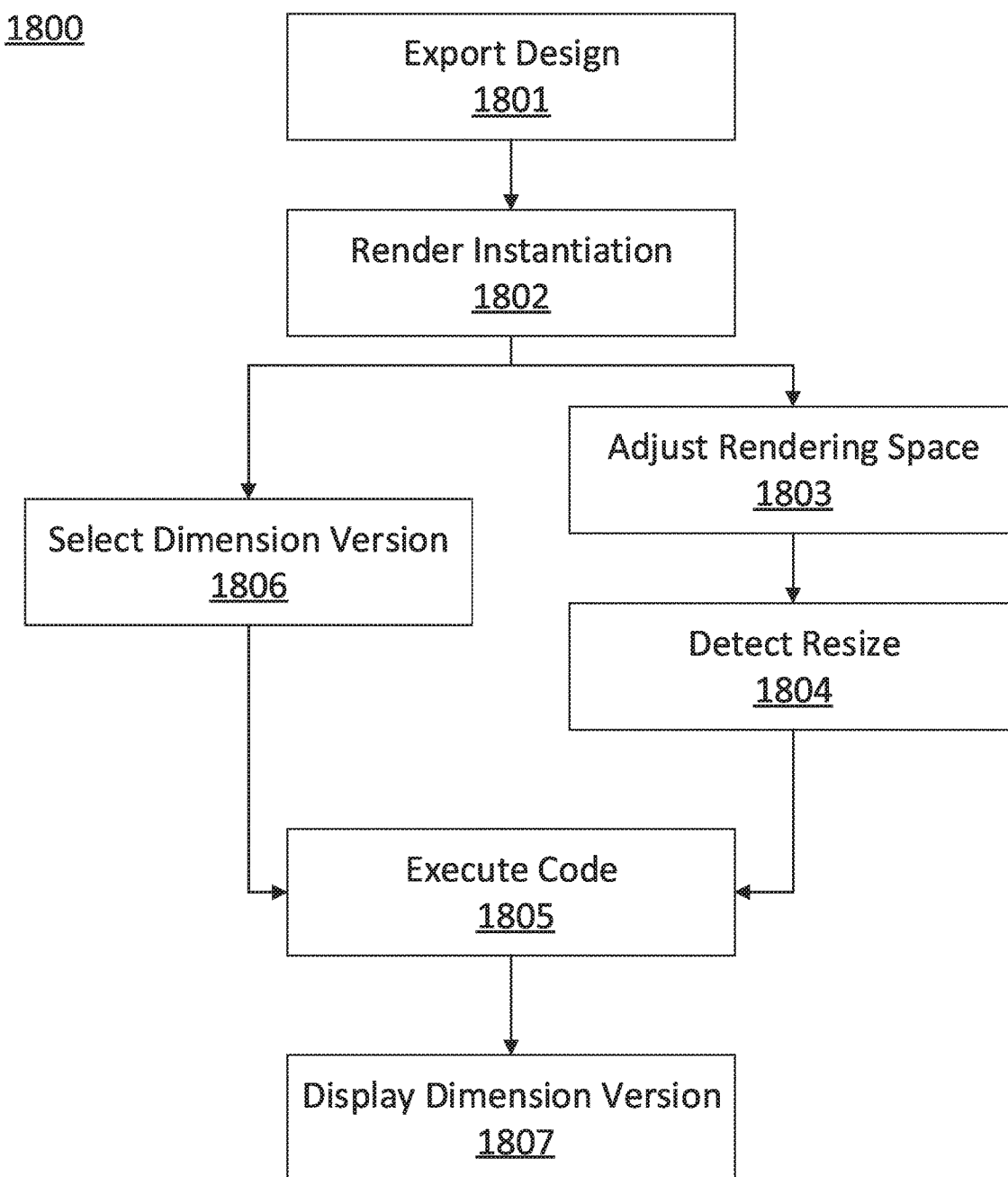
FIG. 18 illustrates a flow chart of a method for exporting and displaying an instantiation of a responsive graphical design that is in accordance with embodiments of the present invention.

A method 1800 for exporting and displaying an instantiation of a responsive graphical design that has been specified through the use of any of the tools and methods described above is illustrated in FIG. 18. In step 1801, the design is exported from the design environment. Prior to this step, the design could have been specified in accordance with any of the methods described above, and the nature of the export could have been selected by a user using any of the methods described above as well.

In step 1802, an instantiation of the design is rendered in an external player. The player can display a predetermined dimension version of the design. The design can execute a script to sense the rendering space afforded by the player, or any other characteristic of the player, and enable the player to render the design in a particular dimension version based on the sensed characteristic. Finally, the player may determine the proper dimension specification to apply itself based on markup language media queries and render the appropriate dimension version without using a script. Note that the player may render the design differently than the encoding specifically requires, in particular, an offset may be applied to any absolute positioning specification for the rendered widgets.

In step 1803, a rendering space dimension of the external player is adjusted by a viewer of the design. This step may be conducted to view the responsive nature of the design. The method will then continue to step 1804 in which the resizing of the design is detected and it is determined if a change in the rendered dimension version is required. This can be done by sensing the new size of the rendering space of the external player and comparing it to the dimension specifications. If a change is required, the method will continue to step 1805 as described below.

In step 1806, another dimension version is selected for rendering without adjusting the rendering space dimension of the external player. This could be done by hitting a short cut key or selecting a different dimension in a selector as described above. The purpose of these approaches is to allow a viewer to analyze the design as it would appear at different dimension versions, but using the same sized viewer for each of the versions.

In step 1805, code is executed to render a different dimension version of the design in the player as initiated by steps 1806, or steps 1803 and 1804 in combination. The code could be javascript that modifies a state of particular widgets in the design so that they appear in a state that matches the newly rendered dimension version. The code could also be HTML associated with a different web page that can be used to render that different web page and display the required dimension version. The different code executed in this step will depend on the manner in which the exported instantiation was generated. In step 1807, the newly rendered dimension version will be displayed in the external player with the widgets in the design rendered according to how they were specified in the particular dimension version being displayed.

Figure 19:
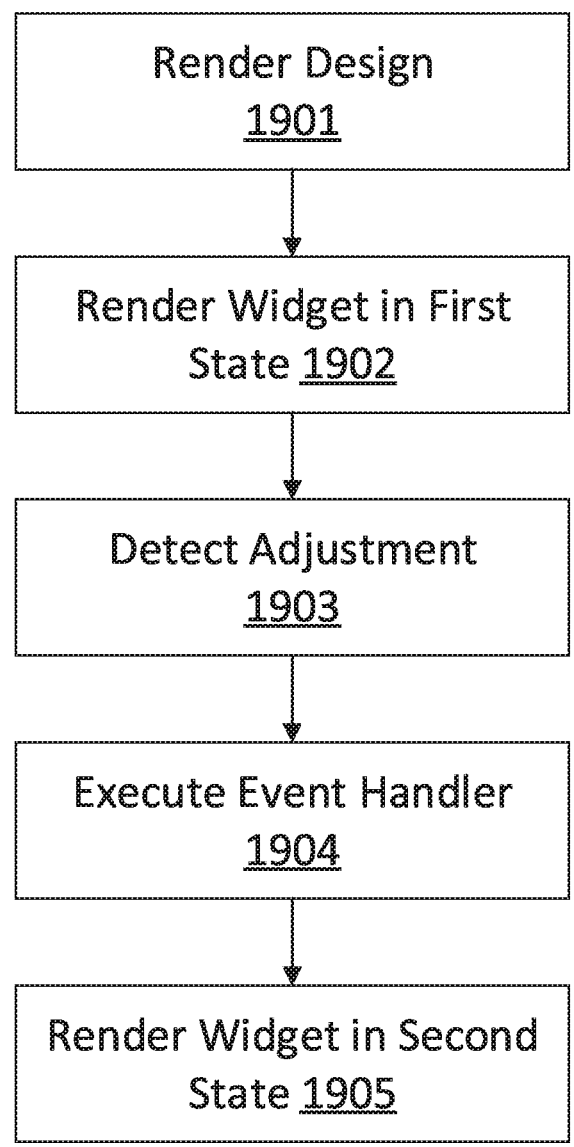
FIG. 19 illustrates a flow chart of a method for rendering a responsive graphical design that is in accordance with embodiments of the present invention.

FIG. 19 displays another method 1900 for rendering a responsive graphical design in accordance with embodiments of the present invention. In step 1901, a graphical design with at least one widget is rendered to allow for a display of the graphical design in a window with an adjustable dimension. The graphical design can be a web page and the at least one widget can be an interactive widget. The graphical design can be an instantiation of a design that was specified using any of the tools and methods described above, and can be encoded in an encoding generated during any export or generation process described above. In step 1902, the widget is rendered in the design in a first state. In step 1903, an adjustment to the adjustable dimension is detected using an object model event detecting javascript function that is encoded in the same encoding as the design itself. Step 1903 can utilize an on-resize event. In step 1904, an event handler portion of the object model event detecting javascript function is executed in response to the detected adjusted dimension. In step 1905, the execution of the event handler causes the rendering of the widget in a second state that is selected by a processor based on a comparison of the detected adjustable dimension and a set of preset dimension definitions. The first state and the second state can differ as to the interactivity of the widget. The preset dimension definitions can be encoded in the same design encoding. The preset dimension definitions can include a width value, a height value, a combination of the two, or any other physical dimension.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. For example, more than one user could specify the design in the design environment in collaborative fashion working with other users, the design could be for the design of an electronically circulated periodical, the dimension specifications could be determined ahead of time and labeled in accordance with a set of popular aspect ratios or devices, the designs could be specified in three dimensions such that the dimension specifications could specify a volume used to render the design, the masters could have container widgets in predefined locations for masters that are to be used as headers or footers, and the predefined containers in the master could be configured to respond in predefined ways to the predefined dimension specifications.

Furthermore, nothing in the disclosure should indicate that the invention is limited to systems and methods that involve web browsers. In general, any diagrams presented are only intended to indicate one possible configuration, and many variations are possible. Those skilled in the art will also appreciate that methods and systems consistent with the present invention are suitable for use in a wide range of applications encompassing any related to responsive graphical designs.

Figure 20:
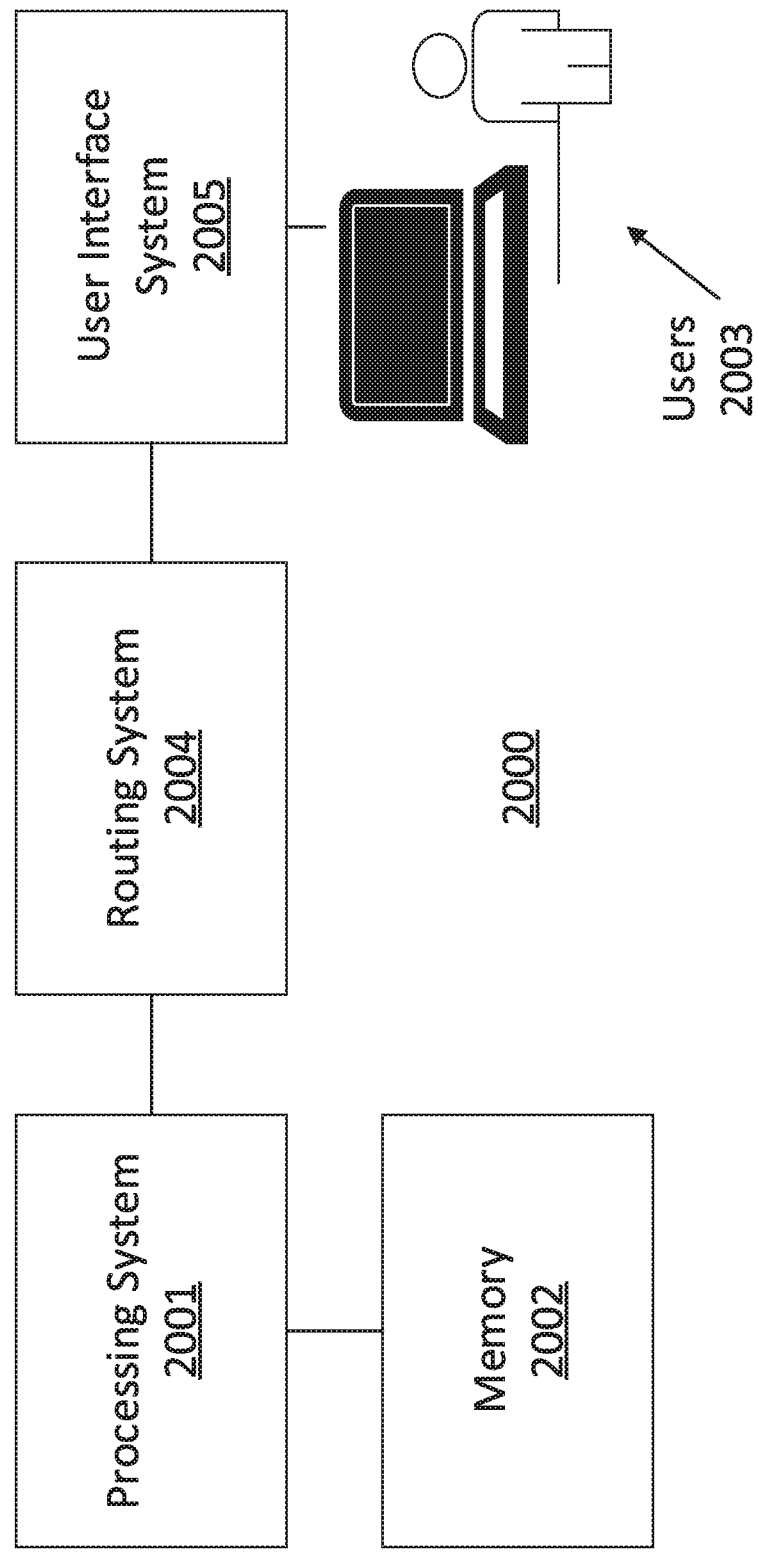
FIG. 20 illustrates a block diagram of a computer system that can be used in accordance with embodiments of the present invention.

Any of the methods described herein can be conducted through the use of a computer system 2000 as shown in FIG. 20. For example, the design environment could be provided by a processing system 2001 acting in tandem with a memory 2002. A user 2003 would be able to access the design environment through the use of a routing system 2004 and a user interface system 2005. Any method steps involving providing or accepting things to and from a user can be conducted using interface system 2005. Any method steps involving executing an action can be conducted using processing system 2001 alone or in combination with memory 2002. FIG. 20 is only an illustrative computer system that is amenable to operation in accordance with embodiments of the present invention and variant computer system topologies may be used in its stead. Nothing in this description should limit the processor of processing system 2001 to a single processor, as the function of this block can be accomplished by multiple physical processors located either on a single work station or server, or distributed through a network. It is not essential for memory 2002 to be physically distinguishable from processing system 2001, as they are merely illustrated as separate blocks for purposes of invoking common conceptions of how computing systems operate. Routing system 2004 could be the internal routing system of a single work station, a LAN, a WAN, a wired or wireless network, the Internet, or any other system capable of routing signals. User interface system 2005 could be a work station, a computer, a mobile phone or other mobile device, or any computing device or group of computing devices capable of receiving inputs from a single user or group of users. FIG. 20 should also not be taken to indicate that the invention can only involve design environments or design programs that may only be accessed by one user as there could be multiple users 2003 and that group of multiple users 2003 could access the design environment using any number of routing systems 2004. Those users could also access the design environment simultaneously.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A computer-implemented method for allowing a user to specify an interactive graphical design comprising:
   receiving an inheritance characterization specification from the user through an inheritance specification user interface, the inheritance specification user interface displaying a graphical representation of the inheritance characterization specification, the inheritance specification user interface being operable to receive an input from the user indicating which properties of a plurality of properties associated with the interactive graphical design will propagate through inheritance;
   rendering a first dimension version of the interactive graphical design based on a first dimension specification, the first dimension version having a parent-child relationship with a second dimension version of the interactive graphical design according to an inheritance structure, the second dimension version of the interactive graphical design being based on a second dimension specification, and the first dimension version of the interactive graphical design being displayed concurrently with the inheritance specification user interface;
   receiving a widget property specification for a rendered widget from the user while the user is editing the rendered first dimension version, the rendered widget being a rendered design element of the interactive graphical design; and
   storing the widget property specification for the first dimension version and the second dimension version in accordance with the inheritance structure and the inheritance characterization specification.

2. The computer-implemented method of claim 1, further comprising:
   rendering the second dimension version of the interactive graphical design based on the second dimension specification; and
   receiving an override widget property specification from the user, prior to receiving the widget property specification from the user, and while the user is editing the rendered second dimension version;
   wherein the override widget property specification indirectly provides the inheritance characterization specification.

3. The computer-implemented method of claim 1, wherein the storing consists of writing the widget property specification to a single address in a memory.

4. The computer-implemented method of claim 1, further comprising:
   receiving a propagation command from the user;
   wherein the propagation command triggers the storing of the widget property specification for the second dimension version.

5. A non-transitory computer-readable medium storing instructions for executing a computer-implemented method, the computer-implemented method comprising:
   receiving an inheritance characterization specification from a user through an inheritance specification user interface, the inheritance specification user interface displaying a graphical representation of the inheritance characterization specification, the inheritance specification user interface being operable to receive an input from the user indicating which properties of a plurality of properties associated with an interactive graphical design will propagate through inheritance;
   rendering a first dimension version of the interactive graphical design based on a first dimension specification, the first dimension version having a parent-child relationship with a second dimension version of the interactive graphical design according to an inheritance structure, the second dimension version of the interactive graphical design being based on a second dimension specification, and the first dimension version of the interactive graphical design being displayed concurrently with the inheritance specification user interface;
   receiving a widget property specification for a rendered widget from the user while the user is editing the rendered first dimension version, the rendered widget being a rendered design element of the interactive graphical design; and storing the widget property specification for the first dimension version and the second dimension version in accordance with the inheritance structure and the inheritance characterization specification.

6. The non-transitory computer-readable medium of claim 5, the computer-implemented method further comprising:

rendering the second dimension version of the interactive graphical design based on the second dimension specification;

receiving an override widget property specification from the user, prior to receiving the widget property specification from the user, and while the user is editing the rendered second dimension version;

wherein the override widget property specification indirectly provides the inheritance characterization specification.

7. The non-transitory computer-readable medium of claim 5, wherein the storing consists of writing the widget property specification to a single address in a memory.

8. The non-transitory computer-readable medium of claim 5, the computer-implemented method further comprising:

receiving a propagation command from the user;

wherein the propagation command triggers the storing of the widget property specification for the second dimension version.

9. The computer-implemented method of claim 1, wherein:

the inheritance specification user interface displays a set of buttons corresponding to the first and second dimension versions, the inheritance specification user interface receiving user input that selects one of the first and second dimension versions for editing by selecting a button of the set of buttons.

10. The non-transitory computer-readable medium of claim 5, wherein:

the inheritance specification user interface displays a set of buttons corresponding to the first and second dimension versions, the inheritance specification user interface receiving user input that selects one of the first and second dimension versions for editing by selecting a button of the set of buttons.

* * * * *